(12) United States Patent
Wilmot, II

(10) Patent No.: US 6,615,340 B1
(45) Date of Patent: Sep. 2, 2003

(54) EXTENDED OPERAND MANAGEMENT INDICATOR STRUCTURE AND METHOD

(76) Inventor: Richard Byron Wilmot, II, 3130 Withers Ave., Lafayette, CA (US) 94549

(*) Notice: Subject to any disclaimer, the term of this patent is extended or adjusted under 35 U.S.C. 154(b) by 0 days.

(21) Appl. No.: 09/533,650

(22) Filed: Mar. 22, 2000

(51) Int. Cl.[7] .............................................. G06F 15/00
(52) U.S. Cl. ........................ 712/209; 712/217; 712/218
(58) Field of Search ................................ 712/209, 217, 712/218

(56) References Cited

U.S. PATENT DOCUMENTS

| | | | |
|---|---|---|---|
| 5,944,811 A | 8/1999 | Motomura | |
| 5,974,538 A | 10/1999 | Wilmot, II | |
| 6,131,156 A | * 10/2000 | Quarnstrom et al. | ........ 712/216 |
| 6,360,315 B1 | * 3/2002 | Potter | .......................... 712/219 |

OTHER PUBLICATIONS

The Metaflow architecture, Gibson, G.; Isaman, D.; Lightner, B.; Popescu, V.; Schultz, M.; Spracklen, J.; Micro, IEEE, vol.: 11 Issue: 3, Jun. 1991, Page(s): 10–13, 63–73.*
Kieth I. Farkas, Norman P. Jouppi & Paul Chow WRL Research Report 95/10 "Register File Design Considerations in Dynamically Scheduled Processors" 11/95.
Andreas Moshovos & Gurindar Sohi "Streamlining Interoperation Memory Communication Via Data Dependence Prediction" Proc. Micro–30, 1997 IEEE USA.
Edward S. Tam et al "Active Management of Data Caches by Exploiting Reuse Information" IEEE Trans. Computers, vol. 48 # 11 pp. 1244–1259, Nov. 1999 USA.
Teresa Monreal et al "Dynamic Register Renaming Through Virtural–Physical Registers", J. Inst. Leval Parallilism, May 2000 USA.
Stephan Jourdan et al "A Novel Renaming Scheme to Exploit Locality Through Physical Register Reuse and Unification" Proc. Micro. 31, 1998, IEEE USA.
Gary Tyson & Todd Austin Memory Renaming: Fast and Accurate Processing of Memory Communication J. Inst Level Processing, 1999 www.eecs.umich USA.
Gary Tyson & Todd Austin "Improving the Accuracy and Performance of Memory Communication Through Renaming" Proc. Micro–30, 1997 IEEE USA.
Keith I. Farkas, Norman P. Jouppi & Paul Chow "Register File Design Considerations in Dynamically Scheduled Processors" 2nd Int. Symp. High–Performance Computer Architecture Feb. 1996, pp. 40–51.

* cited by examiner

Primary Examiner—Jeffrey Gaffin
Assistant Examiner—Justin Knapp

(57) ABSTRACT

Extended operand management indicators stored during initial program execution enable management and regulation of operand values and streamline their handling. Operand values are stored in new types of stores. Operand location management indicators indicate current operand value locations among various store types for selected operands. Indicated operand-forwarding policies for selected operands streamline forwarding of operand values from source instructions to value receiving target instructions. Indicated loop iterations of operand source instructions enable forwarding of operands over more than one loop iteration. Stride indicators indicate strides of program loop accesses to matrix operands. Inter-loop indicators enable forwarding of operand values from source loop instructions directly to target loop instructions. Constant or nearly constant operands are indicated to enable their storage in special caches. Operands used for cross-CPU serialization are indicated for special handling and storage in spin lock cache. Indicators of farthest back and farthest forward branches since operand last update are used to enhance the prediction of longer-range branch directions. Virtual predicate operand indicators streamline execution of densely branching program code. Stack operand indicators enable nullification of paired stack pointer increment-decrement operations to avoid serious operand serialization bottlenecks in very high issue rate machines.

15 Claims, 19 Drawing Sheets

PRIOR ART OPERAND FLOW
MAPPING a) INSTRUCTION LINKED MAPPING STORAGE

| | INSTRUCTION | | LINK | | MAPPING | LINK |
|---|---|---|---|---|---|---|
| 201 | R1 = 16 | 204 | 207 | 207 | R1 TO 202 | 208 |
| 202 | R3 = 8(R1) | 205 | -- | 208 | R1 TO 203 | -- |
| 203 | R4 = R1 + 24 | 206 | -- | | | | b) HASHED MAPPING STORAGE

| | INSTRUCTION | | MAPPING | LINK |
|---|---|---|---|---|
| 221 | R1 = 16 | 224 | -- | -- |
| 222 | R3 = 8(R1) | 225 | -- | -- |
| 223 | R4 = R1 + 24 | 226 | R1 TO 222 | 227 |
| | | 227 | R1 TO 223 | -- |

FIG. 2
PRIOR ART MAP STORAGE

PRIOR ART MEMORY CLOAKING

PRIOR ART MEMORY RENAMING

EXTENDED OPERAND MANAGEMENT INDICATOR STRUCTURE AND METHOD

BACKGROUND OF THE INVENTION

This invention relates to computers and computer system central processing units especially as to methods and structure for handling and storage of operand values.

DESCRIPTION OF PRIOR ART

Central processing units for server computers, workstations and personal computers today typically employ superscalar microarchitectures that will likely be employed in embedded processors as well. These machines aim to execute more than one instruction in each clock cycle. To increase their execution rates many of the present-day designs execute instructions out-of-order. They search through the predicted stream of upcoming instructions to find those that can be started. In such out-of-order schemes an instruction needing results that will be generated by another, incomplete instruction can be deferred in favor of instructions whose input operands are ready for immediate use.

Contemporary computer designs often include means for renaming operands (especially register operands) so that instructions needing the latest value of an operand being computed by a previously issued instruction can access the immediate output of that previous instruction instead of waiting for the value to be stored (e.g. into a register file) and re-fetched. These prior art computer processors fail to gather much information about operands and the flow of operand values and then discard all or most of the information they do gather.

Continuing development of electronics technology has been allowing designers to incorporate more circuits into each computer processor. With ever more circuits it would be advantageous to be able to issue more instructions in each clock cycle but several barriers are encountered in attempting straightforward extensions to today's superscalar methods. To manage more in-process instructions requires larger windows of instructions from which to choose and the complexity of larger windows increases faster than increases in window size.

Among the most severe barriers to increasing the number of instructions executed per clock cycle is multiporting of operand storage. Operands are stored in register files and in memory units. To make up for the relative slowness of large-scale memory units such as DRAMs, faster but smaller cache memories are connected to central processing units. A typical computer instruction might have two input operands and one output operand. Executing such an instruction would require at least three operand accesses. Executing four instructions in each clock cycle would typically require twelve operand accesses. These operands would be typically spread between register storage ("a register file") and data cache storage. Each simultaneous access to a storage unit will require a read or write port. Unfortunately, the number of components required to construct access ports grows much faster than the number of ports supplied. Doubling the number of ports to the register file might require quadrupling the number components devoted to access ports. Increasing the number of ports is also likely to increase the access time to the operand storage being ported. "For a register file, doubling the number of ports doubles the number of wordlines and bitlines (quadrupling the register file area in the limit . . . " [Farkas, Keith I., Norman P. Jouppi and Paul Chow "Register file design considerations in dynamically scheduled processors", p. 18 WRL Research Report 95/10, Digital Western Research Laboratory, Palo Alto]

My U.S. Pat. No. 5,974,538 explains how computer instruction operands can be annotated as to their source (value creating) instructions and operand flows to receiving (target) instructions can then be mapped. This is shown in FIG. 1 where an output 106 of an instruction 101 has been annotated with the address of instruction 101. Subsequent use of operand 106 (R1) by an instruction 103 causes creation of a flow mapping 104 indicating that output of instruction 106 will flow to instruction 103. Subsequent executions of source instruction 101, whose flow has been mapped, can initiate forwarding of operands to target instructions so that they may make use of them as inputs and can trigger those receiving instructions to begin execution earlier than would occur in sequential execution of the same program code.

FIG. 2A and FIG. 2B show the mapping storage structure given in U.S. Pat. No. 5,974,538. FIG. 2A shows mapping information stored in a linked list data structure while FIG. 2B shows a hashed structure with linked overflow. A design might, in that disclosure, sometimes choose to omit mapping some flows from source instructions to operand target instructions and, where flows have been mapped, a machine might operate in speculative mode where operands are forwarded to target instructions before all intervening branch paths from source instruction to target instruction have been resolved.

U.S. Pat. No. 5,974,538 also discusses the use of a Temporary Result Cache [C29 L40] to decrease traffic to architected storage locations for values that will soon be overwritten with newer values. This cache is, however, concerned with holding outputs of instructions until those values have been superceded to avoid materializing them. It is Not Concerned with holding operand values to be forwarded to other instructions as discussed here.

A similar scheme was put forth for memory operands in a paper by Moshovos and Sohi [Moshovos, Andreas and Gurindar Sohi, "Streamlining inter-operation memory communication via data dependence prediction", Proc. Micro-30, December, 1997, IEEE]. In that scheme dependences on memory operands are first detected by annotating memory operands in a small annotations file called a Dependence Detection Table that records the program counter (address) of the last instruction to last touch each recorded address. Part of the system of Moshovos and Sohi is depicted in FIG. 3. A store instruction 302 stores a new value in a memory hierarchy 301 at a storage address 303. The value at that storage address is later used as input by a load instruction 304 that loads the value to a register from where it may be used by other subsequent instructions. The passing of a value from a store instruction to a load instruction causes creation of an association between those instructions that is stored in an association record 307 in a dependence prediction and naming table 312. Later execution of the store instruction will create an entry 311 in a synonym file 310. When dependent load instruction 304 is issued it can obtain its value from the synonym file instead of having to wait for a memory operand address calculation and cache or memory access to complete. Moshovos and Sohi also describe a transient value cache that can hold values likely to be killed (overlaid) soon with new values for the same address. The methods of Moshovos and Sohi are intended for use in a speculative superscalar machine in which instructions are Speculatively issued before all preceding conditional branch instructions have been resolved. The machine will, at times, execute down the wrong path of instructions and have to abandon some of its results. Dependences recorded in the synonym associations of Moshovos and Sohi also include a Predictor that is used to determine whether forwarding should occur between a given pair of instructions. The Predictor described in Moshovos and Sohi is intended only to reflect the likelihood of operand dependence between the instructions. That paper proposed predictors not just of dependencies from store instructions to load instructions but also between load instructions. An instruction that loads a value from a given memory location might be followed by another load instruction that loads the contents of that same memory location. There is then a read-after-read (RAR) dependence between the two load instructions and a system can take advantage of that dependence to bypass the expense of the second load. The Predictor is still concerned with predicting true dependences between instructions as opposed to any other functions.

In a similar paper Tyson and Austin [Tyson, Gary S. and Todd M. Austin, "Improving the accuracy and performance of memory communication through renaming", Proc. Micro-30, December, 1997, IEEE] also describe forwarding of memory values and use of dependency predictors. As depicted in FIG. 4 Values 407 are stored in a Value File 406 from which load instructions speculatively retrieve the values they need without having to await calculation of memory operand addresses. A Store/Load Cache 401 provides indexes 403 and 405 into the value file based on the instruction (PC) addresses of a store instruction 402 and a load 404 instruction.

The last two methods outlined above attempt to Predict whether there are operand dependencies between selected instructions and record confidence information about probable dependence relationships. U.S. Pat. No. 5,974,538 maps actual dependences and may elect not to map some dependences due to distance or uncertainty. None of the above methods provides means to classify operands by use (load vs. store) nor by time proximity of next use. With no means of classification there can be no optimization of operand forwarding or storage. All operands are treated as equal. There is only dependence or non-dependence between Instructions. Storing operands in only one or two possible, Centralized storage structures will lead to bottlenecks as computer designers attempt to scale to much higher instruction issue and retirement rates. Scaling instruction rates with centralized storage structures requires increasingly more ports into those storage structures and such centralized storage cannot be distributed among multiple, loosely connected execution or retirement units.

A paper by Tam et al [Tam, Edward, et al, "Active management of data caches by exploiting reuse information", IEEE Transactions on Computers 48, No. 11, November, 1999, IEEE] analyses several multilateral caching systems. In these schemes, memory operands are classified into two different classes that are stored in two different (multilateral) caches based on behavior of the operands while they were in cache. Operands are sought in multiple caches in parallel to minimize access time. Parallel access to the multiple caches is required because no record is made of an operand's current cache location(s) or, in the case of the original Victim Cache, a second cache is searched when a required operand is not located in the primary data cache. These methods are not scalable to large numbers of execution units because the cache structures are centralized—large numbers of execution units accessing the same centralized cache stores would require non-scalable degrees of read and write multiporting.

Loop Operations.

Much of the work done by computer programs is done in loops. U.S. Pat. No. 5,974,538 details an elaborate mechanism for keeping track of operands in loops and in nested loops but that mechanism applies only to forwarding and combining, not to operand flow mapping and not to discovering multi-iteration loop dependencies. U.S. Pat. No. 5,974,538 also shows a means for simultaneous execution of multiple loop iterations. U.S. Pat. No. 5,974,538 treats forwarding of operands from one loop iteration to a subsequent loop iteration but shows no means to forward operands where the loop iteration distance is more than one. Memory operands can commonly skip loop iterations as shown in a C language loop for ($i=2; i<100, i++$)$m[i]=m[i]+m$ $[i-2]*c[i]$;

where the loop distance is two and m is an array variable in memory.

Tyson and Austin declines to map forwardings for distances greater than one: "our predictors will not work with loop dependence distances greater than one, even if they are regular accesses. Support for these cases are currently under investigation." Likewise Moshovos and Sohi demurs from this task: "since data addresses are calculated dynamically, the lifetimes of the dynamic dependences may overlap (as for example in the following loop that has a recurrence that spans 3 iterations: for i=1 to N do a[i+3]=a[i]+1). In this case, remembering the most recent synonym for the static dependence is not sufficient. Instead, the load has to determine which of all previous synonyms is the appropriate one. Even though support for regular communication patterns can be provided, further investigation of this issue is beyond the scope of this paper."

There are also common cases where one loop fills in or modifies values in a data structure and then those values are used by (flow to) one or more subsequently executed program loops. None of the documents referenced above teach any means to map such inter-loop flows or any way to exploit such flows at execution time.

Instruction level parallelism could be increased and program execution times decreased in highly parallel computer designs by exploiting operand flows that cross more than one intra-loop iteration (loop distance greater than one) or that flow into other, subsequent loops by forwarding those operands and starting target instructions where the forwarding has made all needed operands available. But such forwarding will require more information about operand use. Information that is discarded by today's processor designs.

Multiple Processor Designs.

Modern mainframe, server, and workstation computer systems often include multiple central processors (CPUs) in a Symmetric Multi-Processing (SMP) arrangement where main memory (typically semiconductor-based) is shared but one or more levels of fast cache memory are not shared. It is a problem in SMP computer systems to keep the private caches coherent so that all processors will see a unique memory location as having the same value. This problem is complicated by executing memory access (load or store) instructions speculatively before it is known whether the branch paths leading to those memory access instructions will actually be followed. It could be very inappropriate for a speculative load or store instruction to send cache coherence signals to other processors when a branch leading to that instruction might have been mispredicted so that the instruction's execution will have to be nullified. It would be even more problematic if a synchronization instruction, like Compare And Swap were speculatively executed and affected execution in one of the other memory coupled processors. The latter problem would lead to incorrect operation. Speculative execution of loads and stores to memory areas that could contain operands shared across CPUs requires facilities missing from current computer designs.

Branch Prediction.

Branch prediction has been improved to the point of being very accurate, but not perfect. Predicting that a given instruction will or will not be executed requires that all intervening conditional branches between the last resolved branch and the given instruction be correct. Since conditional branches are extremely common, often between 15% and 25% of executed instructions, increasing instruction execution rates to very high levels requires increasing the number of conditional branches whose outcomes are predicted. To issue 16 instructions at each cycle may require correct predictions for four branches per cycle and the latency of the oldest unresolved branch could be several cycles so it may be necessary to predict a dozen branches. If branches are predicted with 95% accuracy then the accuracy of a dozen branches is 0.95 raised to the twelfth power, which is only a bit above 54%. So nearly half the time instructions issued in the current cycle would need to be abandoned, restarting from the first incorrect branch. A prediction method with longer range than those in current use would allow easier, more efficient increases in instruction execution rates. Information about operand flows between instructions is often a better indicator of longer-range instruction flow than is information about the history of the intervening branch instructions. Today's typical computer processor design retains the branch history whilst discarding the operand flow history even where the operand flows show that the flows of instruction control converge to a common subsequent instruction that could be issued early to increase instruction level parallelism.

Stack Pointer Operations.

Stack data structures are useful to a number of tasks carried out by computer systems. They are used for call-return instruction addresses, for subroutine data passing and for dynamic (function/subroutine automatic) work areas. Many subroutines are quite short, comprising only a few instructions. Completing dozens or even hundreds of instructions for a single thread in each clock cycle will require multiple updates to a single stack pointer. However, today's processor microarchitectures could not accommodate such high levels of instruction parallelism because they must single thread the updates to such a stack pointer. Easing this bottleneck will require retention of operand information that these prior art designs discard.

The foregoing and other objects, features, and advantages of the invention will be apparent from the following detailed description in conjunction with the drawings.

SUMMARY OF THE INVENTION

The present invention is a computer system and method for managing operands to improve their flow and storage and to better exploit their behavior during instruction execution to increase instruction execution rates. Operand behaviors are noted in a new class of operand management indicator store means: extended operand management indicators. These indicators are used to select among different classes of operand storage and among different operand forwarding modes. Operands that are read-only or are seldom changed have their values stored in K-Caches that are designed for operands that are never or nearly never updated. Such caches can be replicated without needing frequent coherence operations so that instruction execution can be distributed across computer logic areas or even onto multiple, separate parts (e.g., separate chips). Because they are seldom updated, K-caches also have fewer write ports than other caches. Load and store operations that use constants as address inputs or that repetitively reload unchanged values can be streamlined. Operand values that will be immediately used are forwarded directly to instruction execution units that will need them. Operand values that will not be needed so soon are stored in transient value cache(s) to await execution of the target instructions that will need them.

Memory operand values created in loops are annotated to identify their loop source iterations. Storage of this operand management information enables forwarding across multiple loop iterations (not limited to a distance of one) and possible forwarding to other loops having these operands as inputs.

Extended operand management information is also used to record those operands that are subject of inter-processor (SMP) cache coherence signaling and cross-CPU serialization operations so that memory sharing can be done with less delay.

Other extended operand management indicators are employed in extending the range of branch prediction and to speculatively forward operands to receiving instructions conditional upon prior branch paths.

Extended operand management indicators are also used to streamline push and pop stack-addressing operations.

BRIEF DESCRIPTION OF THE DRAWINGS

FIG. 2 shows the prior art structure for operand flow map storage.

DETAILED DESCRIPTION

Computer Block Diagram

Figure 1:
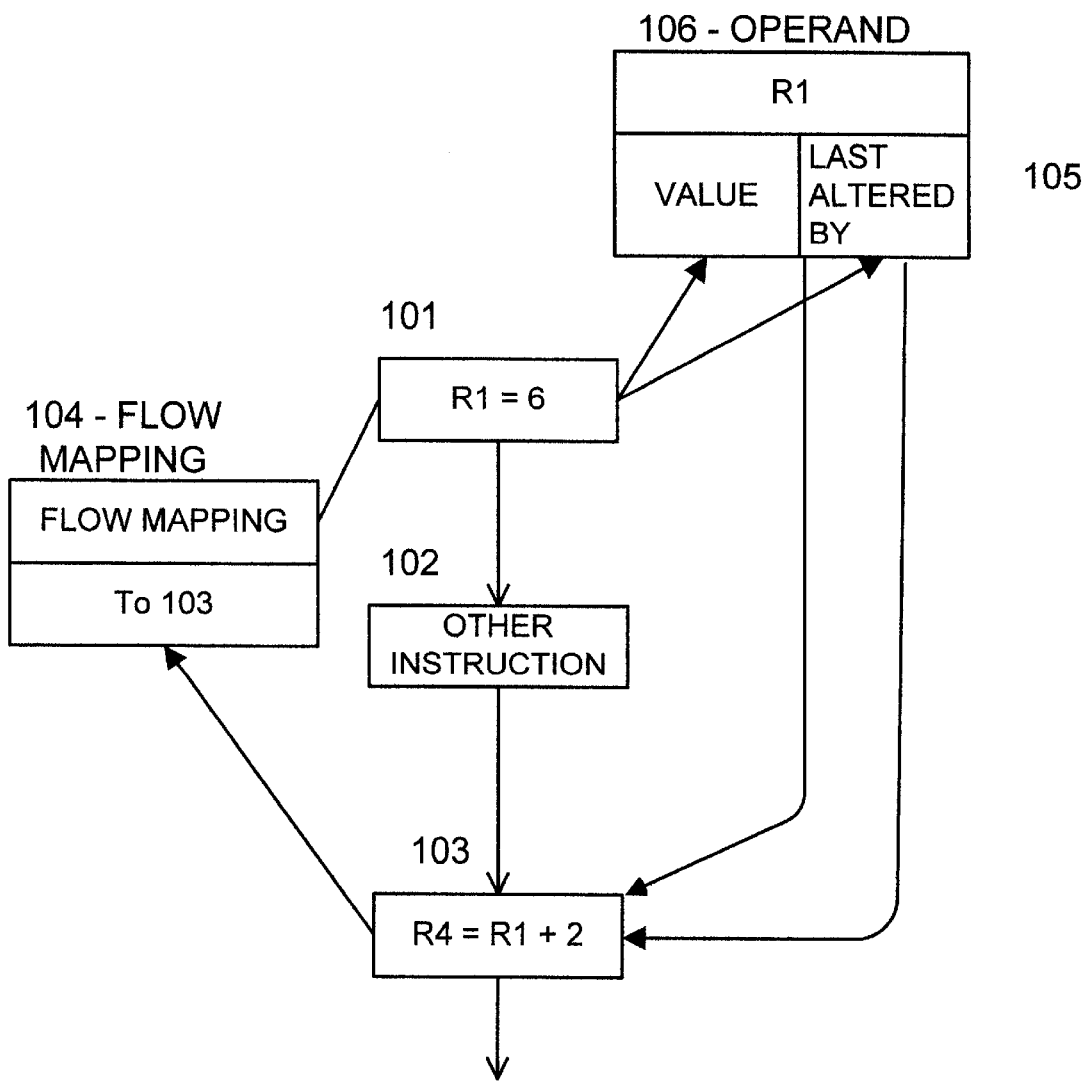
FIG. 1 shows prior art operand annotation and flow mapping.
Figure 3:
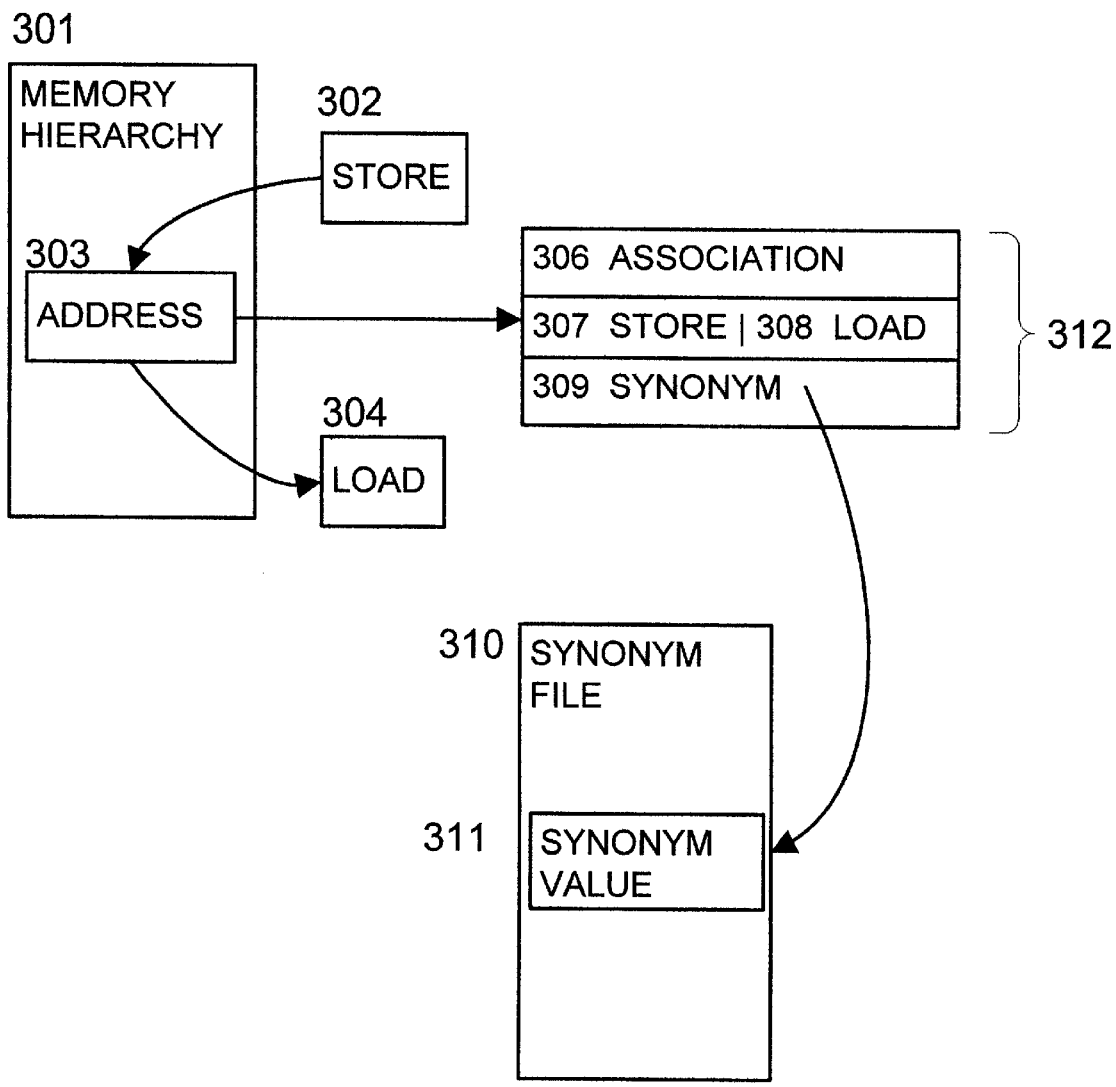
FIG. 3 shows a prior art memory cloaking technique.
Figure 4:
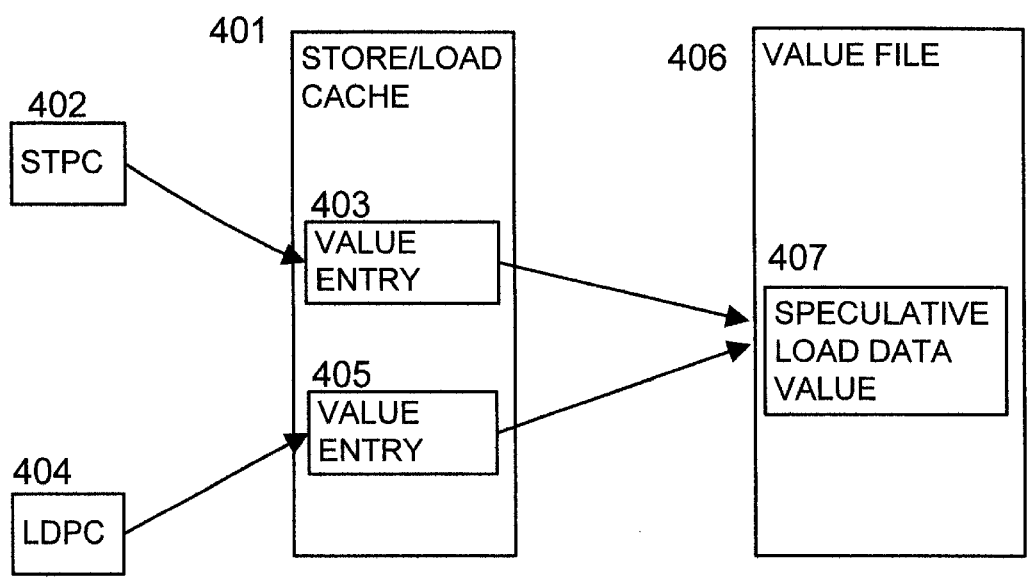
FIG. 4 shows a prior art memory renaming technique.
Figure 5:
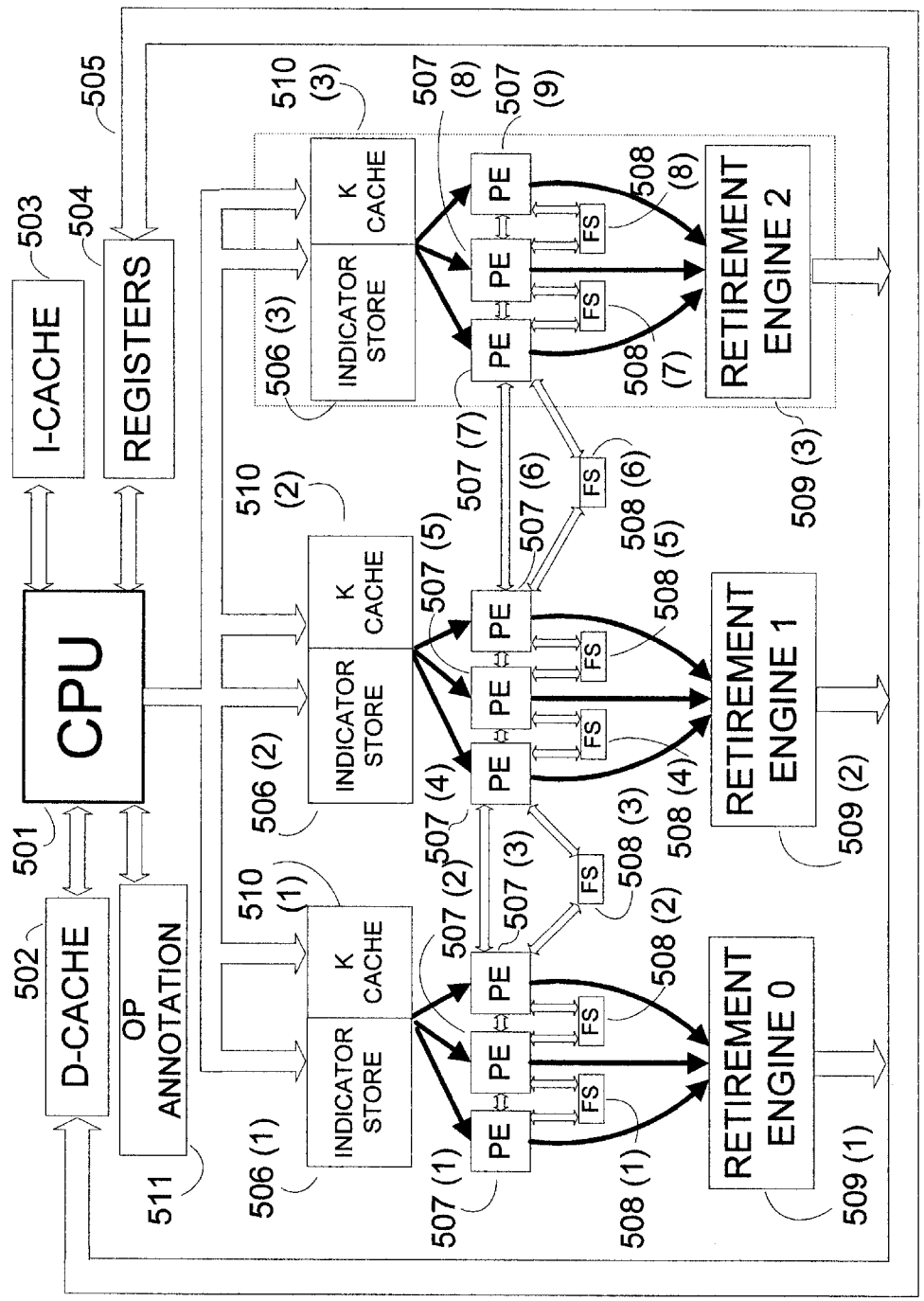
FIG. 5 is a block diagram of a computer system processor according to the present invention.

In FIG. 5, a block diagram representation of the present invention is shown. The computer system includes a central processing unit (CPU) 501 with a data cache (d-cache) 502, an instruction cache 503 and a register file 504. These components are sufficient to complete the instructions of a computer program even without the other components shown in FIG. 5. An operand annotation store 511 records the identities of source instructions that create new operand values so that operand flow maps can be constructed when a later instruction uses those output operands as their inputs. In some implementations, the information in the operand annotation store might be appended to and stored with the register file values and/or the d-cache data value entries for register values and memory operands respectively.

Performance of a computer system can be vastly increased with additional components. The key, fundamental characteristic of these additional components is that they can be replicated and scaled to much higher levels than would be possible with centralized components that require global communication. Indicator stores 506 in FIG. 5 can store operand flow maps, extended operand management indicators, branch predictions and forwarding predictions. Along with the indicator stores are a set of constant caches 510. Constant caches (k-caches) 510 are intended to store operands that seldom change as well as those that never change or cannot be changed. Since the stored indicators and operands seldom change, their contents can be replicated. Multiple instances of indicator stores or k-caches can be managed separately or kept synchronized. They can economize on multiporting. Each can be equipped with one or a few write ports to accommodate new values and only a small number of read ports.

The information stored in the indicator stores can be structured for access by operand addresses, by source instruction addresses, by target instruction addresses, or by any combination. The best access method depends on the type of indicator and when it is to be accessed.

After initial flow mapping and setting of extended operand management indicators, as a byproduct of program execution by the standard CPU 501 in FIG. 5, instructions triggered by operand flows are executed by the plurality of processing elements 507. A result value generated by processing element (PE) 507(1) can be used as input to the next instruction assigned to that PE if the arrangement of instructions permits or that output operand can be forwarded directly to another PE, 507(2) for example, through a direct connection between PEs. If the output operand cannot be immediately input to another PE then it is stored into one of a plurality of transient value caches 508. These transient value stores serve as local caches for the attached PEs or as forwarding stores between PEs. An operand value stored into a transient value cache might be retrieved later by the originating PE or forwarded to another PE. Several PEs could share a single transient value cache but the quickly increasing cost and operating delay of multiporting to handle simultaneous access by an increasing number of PEs will require splitting the transient value cache as shown in FIG. 5 where no more than two PEs share access to any single transient value cache. To forward operand values between PEs it will also be necessary to interconnect the transient value caches or to interconnect the PEs to transient value caches "belonging" to other PEs. Such extra connections are not shown in FIG. 5 for clarity.

Instruction cache 503 is also seldom updated but is not shown as being replicated in FIG. 5 as it is assumed that the instruction information needed by the PEs for instruction execution is included in operand flow mappings in indicator stores 506.

Results from instruction execution are also forwarded from all the PEs 507 to retirement engines 509. FIG. 5 shows some number of PEs sharing each retirement engine. The retirement engine arranges results of execution of a group of instructions so that those results will be committed and materialized to the rest of the computer system. Retirement engines also discard outdated values. If two or more instructions that are to be committed together have both updated the same operand then it is only necessary to commit and keep the second value. The retirement engine sends the output values from multiple instructions to the data cache and/or to the register file as well as to other retirement engines. The data cache might then update corresponding values in a lower level cache or the computer system's main memory (e.g. RAM). Each retirement engine can have multiple groups of outputs in process at the same time though the results might be actually materialized in instruction order.

Extended Operand Management Indicia

Extended operand management indicators overcome restrictions in performance and scalability that limited the prior art. These new indicators allow:

Indication of current operand location among various caches of varying type.

Indication of how operands should be forwarded between instructions.

Indication of loop instance of the instruction that last updated an operand.

Indication of loop stride distance between loop operand update and use.

Indication of operand flow between one loop and another loop.

Indication of operands that are constant or nearly constant.

Indication of the location of source operand input for instructions.

Indication of operands that are subject of inter-CPU synchronization.

Indication of operands that are stored in spin lock cache storage.

Indication of which CPU last altered an operand.

Indication of farthest back and farthest forward branches affecting an operand.

Indication of virtual predicate flow.

Indication of predicated execution.

Indication of stack position operand forwarding.

Indication of nullification of stack position update instructions.

Operand Forwarding and Storage Classification

Figure 6:
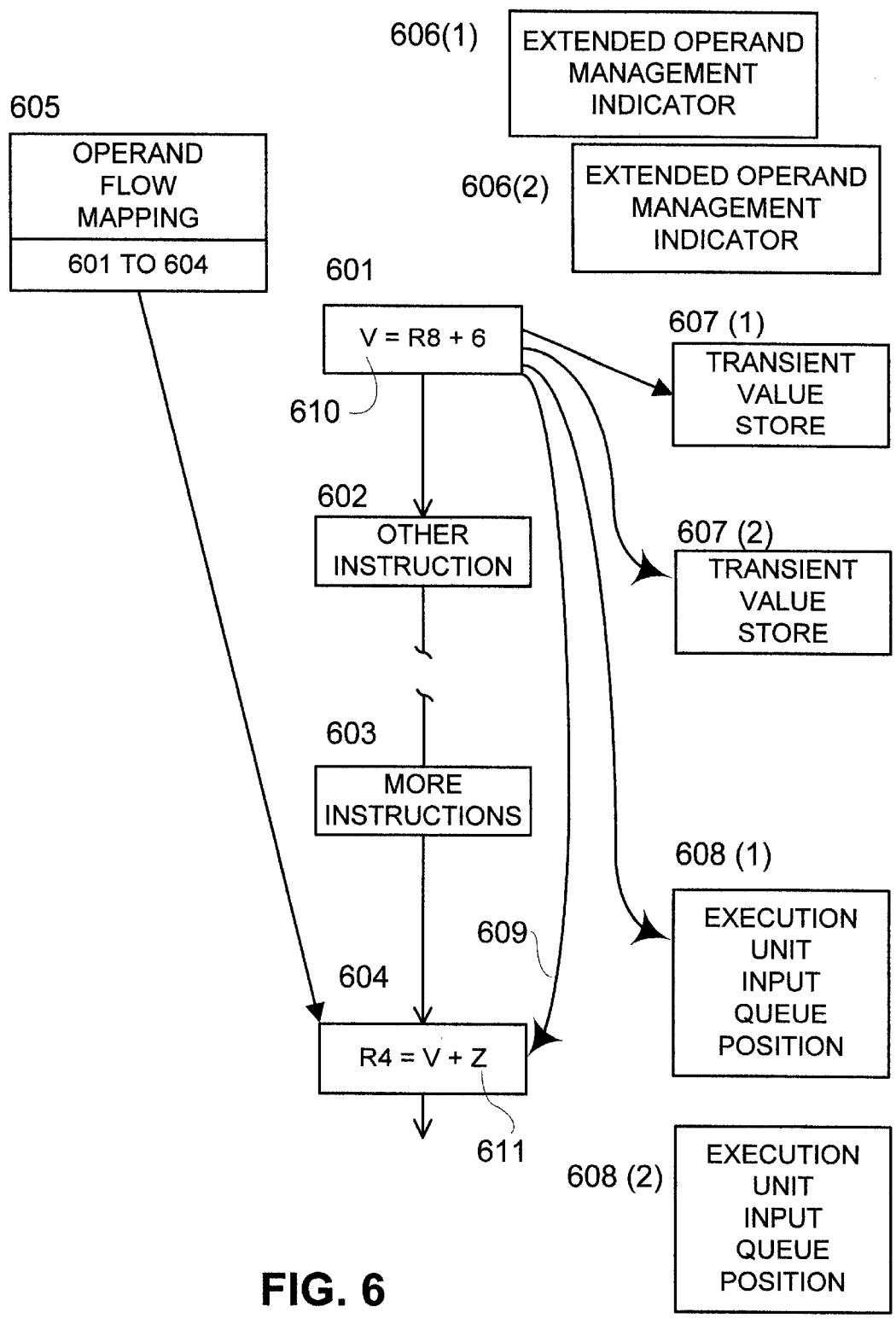
FIG. 6 shows use of extended operand management indicators to indicate operand store locations.

The output resulting from execution of an instruction may be needed by other instructions immediately in the next instruction or the output might go unused by many subsequent instructions. Output that is used in a closely following instruction might also be used by other instructions much farther removed from the value creating, source instruction. In FIG. 6 an instruction 601 changes the value of a variable named V 610 where V might be a register or might be a variable assigned to memory. A later instruction 604 uses the new value of V 610 so there is a data flow from instruction 601 to instruction 604. This flow can be detected in a first execution of the instruction sequence and recorded in an operand flow mapping 605.

If instruction 601 is executed again then operand flow mapping 605 can be exploited to forward the new value for operand V to instruction 604. This forwarding can be done with a Direct Flow 609 where execution of flow target instruction 604 might be immediately triggered. This direct and immediate forwarding and possible triggering (if the forwarded operand is the last or only input operand to target instruction 604) can increase instruction level parallelism because more instructions can be executing in parallel. Under some circumstances, direct forwarding can also have disadvantages. If the target instruction is far removed from the source then there may be a considerable time lapse between the anticipatory execution of the target and a use for its output or action. If the target instruction requires other inputs then there can be a long wait, of many clock cycles for arrival of the other operands. Where operands will not be needed for many cycles but have been forwarded to an execution unit, those operands will needlessly occupy storage in those units.

In its first execution of an instruction sequence, a computer processor predicts the best time and method for forwarding an operand from producing source instruction 601 to target instruction 604. The system could include forms of storage that would match the need for forwarding operands. If, in the sequence of instructions shown in FIG. 6, there are many instructions 603 intervening between instruction 601 and operand target instruction 604 then the value of operand V 6will be stored in a Transient Value Store 607(1), 607(2) and this operand management policy will be stored in Extended Operand Management Indicator 606. There can be some number of transient value stores. They could be divided by expected activity of the stored operands. Some operands are very quickly overlaid with new values while others are seldom updated. Fewer updates require fewer write ports so transient value cache designs could be tailored to expected update requirements. Transient value stores might also be divided among execution units so that first transient value store 607(1) would primarily or exclusively serve a first execution unit and second transient value store 607(2) would serve a second execution unit. Only two such transient value stores are shown in FIG. 6 but there could be many transient value stores. These stores are like data caches, they might be indexed by and accessed with operand memory addresses or they might be indexed by and accessed with target instruction addresses.

Referring still to FIG. 6, if instructions 602, 603 intervene between source instruction 601 and operand flow target 604 and none of those intervening instructions are conditional branches then the distance between the source and target instructions is pre-computed in the first execution. This distance from source to target is used to determine an appropriate position (slot) in an input queue 608(1) for an execution unit. In subsequent executions of the same sequence of instructions the output V 610 of instruction 601 would be placed in the correct position in input queue 608(1) of a selected execution unit. The execution unit will then have the input operand ready to hand when executing target instruction 604. It will not be necessary to compute the address of the input operand nor to access a shared cache since the value will be in a queue that is private to the assigned execution unit. Avoiding computation of operand addresses and cache accesses significantly speeds instruction execution as well as enabling easier distribution of execution components to other areas of electronic logic, even to other components (e.g., chips), or even other subassemblies (e.g., boards). Decisions made about operand storage and forwarding are stored as Extended Operand Management Indicators 606.

Extended operand management indicators can be stored together with the operands to which they pertain or in one or more indicator caches that are indexed by and accessed with the memory addresses or cache addresses of the source instruction. These would be appropriate where the processor designer wishes indicators to store policy decisions pertaining to a particular operand or collection (e.g., array) of operands. This might be beneficial where an operand is used in many instruction interactions and it is desired to implement an overall policy for that operand.

Extended operand management indicators could be stored with or indexed by the addresses of their source instructions. This enables different operand storage and forwarding policies where an operand is updated by more than one instruction. One of the instructions updating an operand might be closely followed by the only instruction using that operand whereas some other instruction in a different instruction sequence updates that same operand but no instructions use the new value for a long period of time. Operand management means for the first updating instruction might directly forward the new value to the target instruction that will need it while the second update would be set to store its new value in an architected location such as a register file or data cache or in a transient value cache. These decisions would be recorded in extended operand management indicators associated with each of the operand-value-creating update instructions.

Some extended operand management indicators could be stored with or indexed by the addresses of the target instructions that will need their values. This form of annotation might inform the target instruction as to the storage of its input—whether the value has been stored in an architected location or in a selected one of transient value caches. This extended operand management indicator would then, in subsequent executions of the target instruction, be immediately available so that fetching of the datum value could be begun from the indicated storage: data cache, transient value cache. In addition to an indicator, the actual value of an input operand to a target instruction could also reside in storage (a transient value cache) that is stored with, or indexed by and accessed with the address or identity of the target instruction. The value would then be immediately available to the target instruction. The processor would be informed of this situation by an extended operand management indicator, which might also reside with the target instruction or be accessed by the address or identity of the target instruction.

Extended operand management indicators can be employed in computer processors that forward operand values to instructions far removed from the source instructions as taught by U.S. Pat. No. 5,974,538 and in computer processors that issue instructions from a fixed window as in today's typical superscalar processor. If, in FIG. 6, the distance between source instruction 601 and operand using (target) instruction 604 is sufficiently short that both instructions would be in the instruction execution window at the same time then a decision could be taken for subsequent executions of instruction 601 to forward the operand V 610 from instruction 601 directly to instruction 604 and start instruction 604 if the value of its other operand, Z 611, will already be known by that time. This decision for direct forwarding would then be recorded in extended operand management indicators 606. In such a fixed execution window processor, if the forwarding distance from source instruction to operand target instruction is likely to exceed the window size, then a different forwarding technique might be selected.

The computer system initially classifies operands after the first execution of an instruction sequence. These operand classification decisions must be recorded so that they can be acted upon in subsequent executions of the same sequence or parts of the same sequence of instructions. Referring again to FIG. 6 the operand classifications are stored in extended operand management indicators 606 (Indicia). This indicia storage means may include other classification decisions as described below. The extended operand management indicators for a single operand can be physically spread over several different storage means structured in different ways and shared in different ways among system components.

Loop Operand Management

Figure 7:
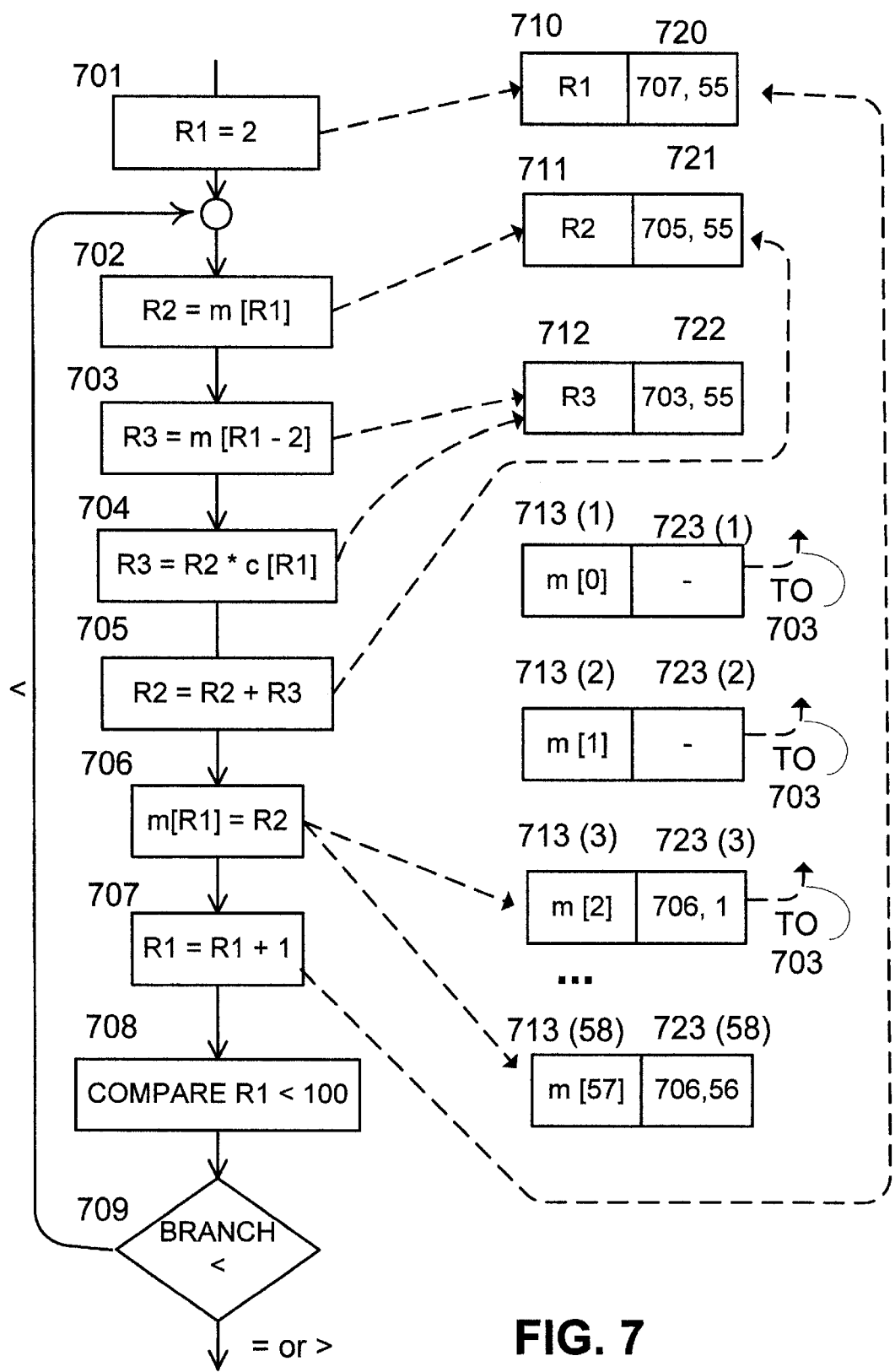
FIG. 7 shows intra-loop operands.

Application of extended operand management also increases parallelism in executing program loops. Annotating operands with the identities (e.g. instruction addresses or instruction cache locations) of the instructions that were the sources of the operands' last values allows detection of data flows to subsequent instructions that use those operand values as inputs. If that annotation is augmented with Iteration Counters then the system can determine the loop distances of data flows. For the c language program fragment:

for ($i=2; i<100, i++$)$m[i]=m[i]+m[i-2]*c[i]$;

FIG. 7 shows data flows after the 56th iteration at start of iteration 57. Operand source iterations 720–723 are shown as associated with current operand values 710–713 respectively in the drawing. Operands R1, R2, and R3 are single-valued (likely to reside in registers). m[0]–m[56] is an array of values 713(1) through 713(58). Array element m[57] 713(58) has just been updated by instruction 706 so the annotation 723(58) for this operand has been annotated with an instruction identity for instruction 706 and with an iteration number of 56 (counting iterations from 1). The value stored in m[56] will be input to an instruction 703 in that iteration (iteration number 58) following the one just started. Operand m[2] 713(3) was input to an instruction 702 and updated by an instruction 706 in iteration 1 and was then used as input to instruction 703 in iteration 3. The system determines, by iteration 3, that there is an operand flow from instruction 706 to instruction 703 with a loop distance of 2. This determination then causes creation of an operand flow mapping from instruction 706 to instruction 703 with an annotation indicating a loop distance of 2.

Though not shown in FIG. 7 for simplicity, iteration counters can be extended to encompass embedded loops where the scope of an inner loop is contained within the scope of a subsequent, outer loop. In the instruction set architectures of most processors the nested loops are implemented by a first, conditional, loop-back branch and one or more outer, conditional loop-back branches with two or more different branch counters or other condition variables. To cover nested loops iteration counters are extended to include two or more loop counts along with the operand source instruction identifier.

Figure 8:
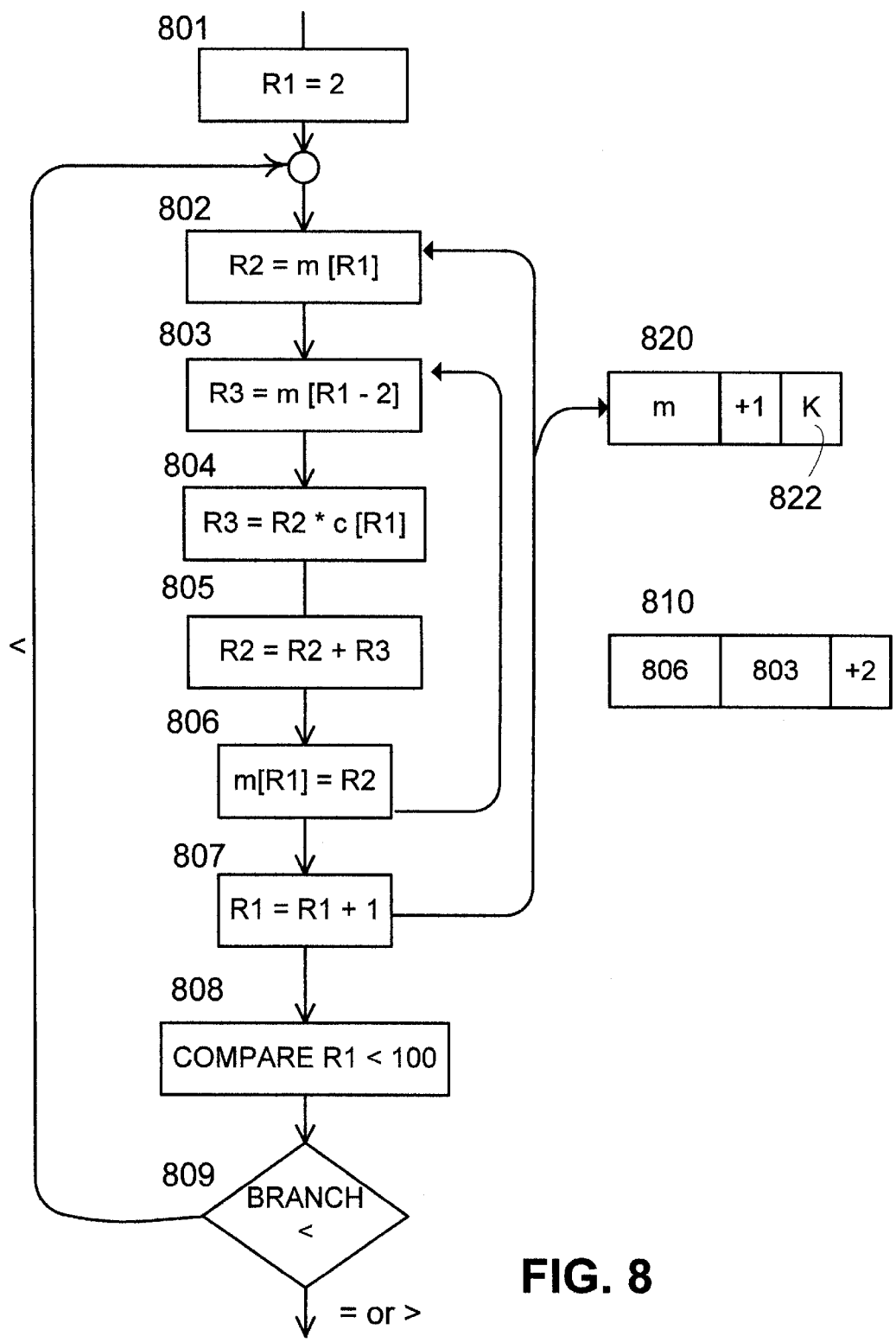
FIG. 8 shows intra-loop operand flows.

In FIG. 8 an extended operand management indicator 810 indicates a loop operand flow that connects a source instruction 806 to an operand target instruction 803 with a loop distance of +2. With the flow thus mapped the system forwards, on the next iteration of instruction 806, the new value directly to instruction 803 annotated with an iteration identity of the current iteration +2. Forwarding of the operand to instruction 803 triggers firing of that instruction without having to compute the operand's address (because the operand flows in the loop have been mapped and addressing has been determined to be by simple increment/ decrement) or the operand value can be kept in a private store or in a transient value cache to await execution of instruction 803. Having annotated the loop operand, the processor can also anticipate upcoming operand accesses. It can predict the stride of array accesses. This stride prediction would be stored as another extended operand management indicator.

In FIG. 8 the predicted stride for accesses to array operand, m is stored in an extended operand management indicator 820 to indicate a stride of +1 from the prior access. It will be clear to those skilled in the art that operand loop distance is a different property to the stride. Stride is the distance between array accesses in successive loop iterations. Loop distance is the number of loop iterations skipped by an operand that flows between iterations.

For predicting stride, it is necessary to ensure that the operand index or pointer is only incremented or decremented by constant values between loop iterations. Extended operand management indicator 820 includes a Constant Increment/Decrement Indicator 822 to signal that loop operand pointer R1 is only changed by a constant increment per iteration that has only taken a single value in recorded executions.

Inter-loot Mapping and Forwarding

Figure 9:
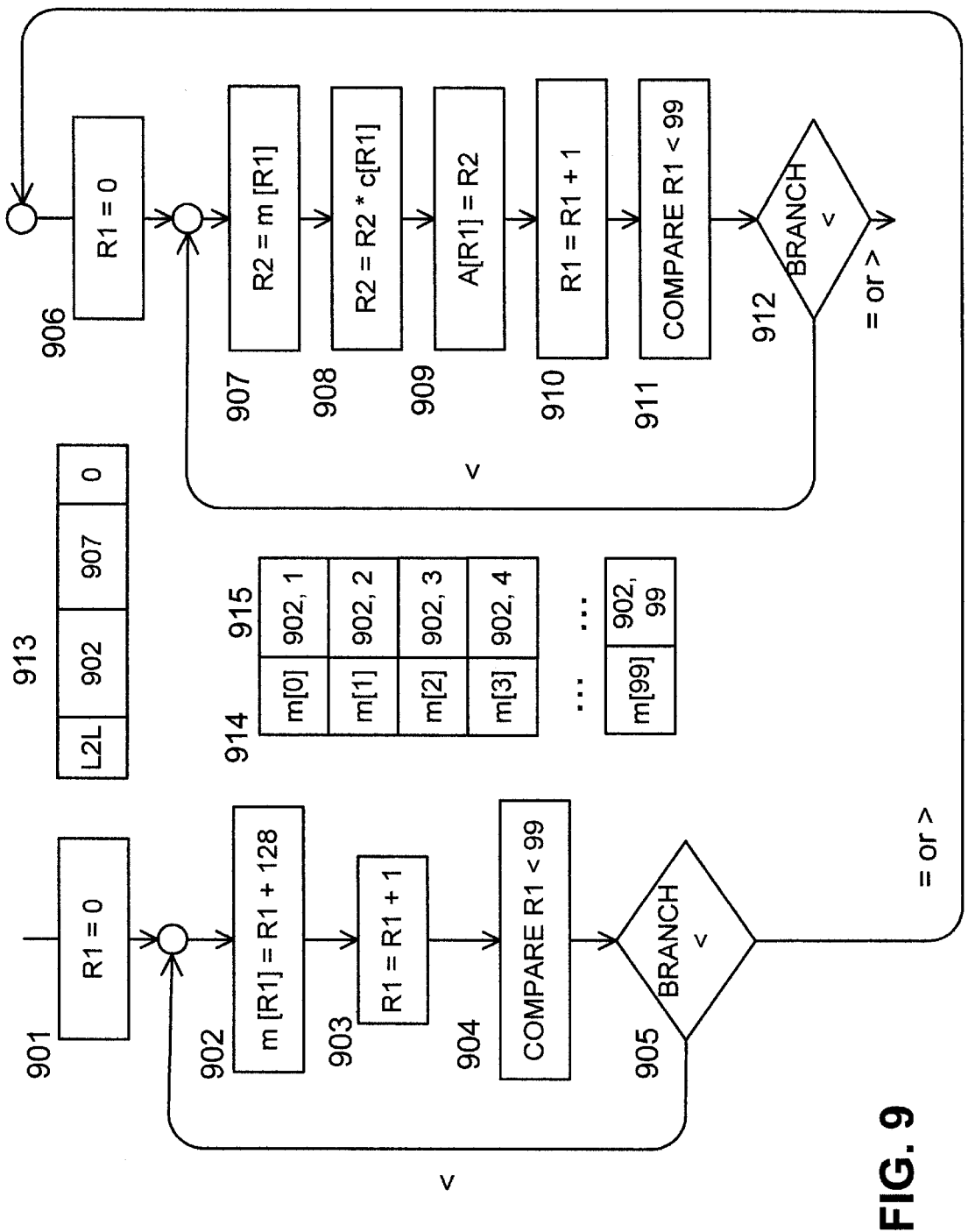
FIG. 9 shows inter-loop operand flows.

It is often the case that one loop stores values into an array and those array values are then used as inputs to a second or subsequent loop. A first loop 902–905 in FIG. 9 is seen to fill in values in an array of operands 914. The values in these operands are then loaded and used as inputs to the computations of a second loop comprising instructions 907–912. An array of operands has been annotated with instruction and loop iteration identities 915 of the instruction that last updated each of the operands. In the example of FIG. 9 the first loop has completed all its iterations and the second loop of instructions 907–912 has begun. By comparing iteration numbers annotating the operands with the actual iterations being executed in the second loop, particularly at instruction 907 which loads the array elements as inputs, the processor can determine that the output of the first iteration instruction 902 in the first loop is the input to the first iteration of instruction 907 in the second loop. This loop-to-loop flow is reflected in an extended operand management indicator 913 that shows a loop-to-loop forwarding from instruction 902 to instruction 907 with an iteration distance of 0. That is, a value flow from a first iteration of the first loop to a first iteration of the second, recipient loop.

As taught in U.S. Pat. No. 5,974,538 the processor executes beyond the loop back branch instruction 905 of the first loop as soon as the instructions in the scope of that loop have been mapped to determine that there are no wild branches out of the loop. Since the mapping can be done in a first iteration of the first execution of the loop, the parallelism benefits are available even the first time the loop is encountered, after first mapping-mode execution of the loop back branch. Instruction 906 is pre-executed (but not committed) since it has no dependency on prior instructions. Execution of the second loop begins even while many iterations of the first loop remain to be executed though the values generated in the second loop must not be committed until the prior instructions have committed. Thus values flow from the first loop to the second loop and trigger execution of iterations of the second loop so that both loops execute at the same time with the second loop perhaps trailing the first loop by several iterations. This means that the second loop could be finished or nearly finished executing (but not committing values nor materialization of results to other processors or peripherals) before any accesses are made to architected operand storage or more than a few accesses to regular data cache. This would greatly increase parallelism by executing multiple loops concurrently and could significantly increase the speed of memory accesses. The second loop would not need to access cache or memory for values of the array m[] and the new values for array m[], that would need to be stored in cache and possibly into main memory, would all be known before any action need be taken. The array elements could be written to memory in larger blocks. If array elements were updated individually as in today's superscalar processors, it might be necessary to fill cache lines from lower levels of memory whereas in the present scheme the writing of the values to cache can be deferred, without delaying execution of dependent instructions in the target loop. Where contiguous, the array of new values can be written mostly as blocks without waiting to first read the prior values of the array m[] into cache. This too removes a bottleneck to allow greater instruction level parallelism and thus higher performance computer designs.

Constant and Nearly Constant Operands

Instead of being the result of computation during execution of a program, many operands get their values from program code. They are constants. Other operand values, once set, are seldom changed. They are nearly constant. In computers having many registers it is even the case in many programs that some registers are nearly constant. This is especially true for registers acting as addressing bases for certain common structures such as the program 'global' area. If these constant or nearly constant operands can be identified then copies of their values can be made available in multiple caches and used in parallel by execution units with less necessity for costly multiporting than with access from a single, central shared data cache. Provision of even a single constant cache (K-cache) can enhance the performance of a processor design. A K-cache can be specialized to have many more read ports than write ports since its predominant use is to read values, though it will need to place new operands in the cache as they are discovered requiring at least one write port but not the larger number of write ports needed for operands whose values frequently change. Having multiple K-caches means that new values will need to be propagated to the multiple K-caches. Due to costs of value propagation, designers would favor such replication only for operands whose values are seldom changed. K-caches could serve register-resident operands as well as memory operands.

Figure 10:
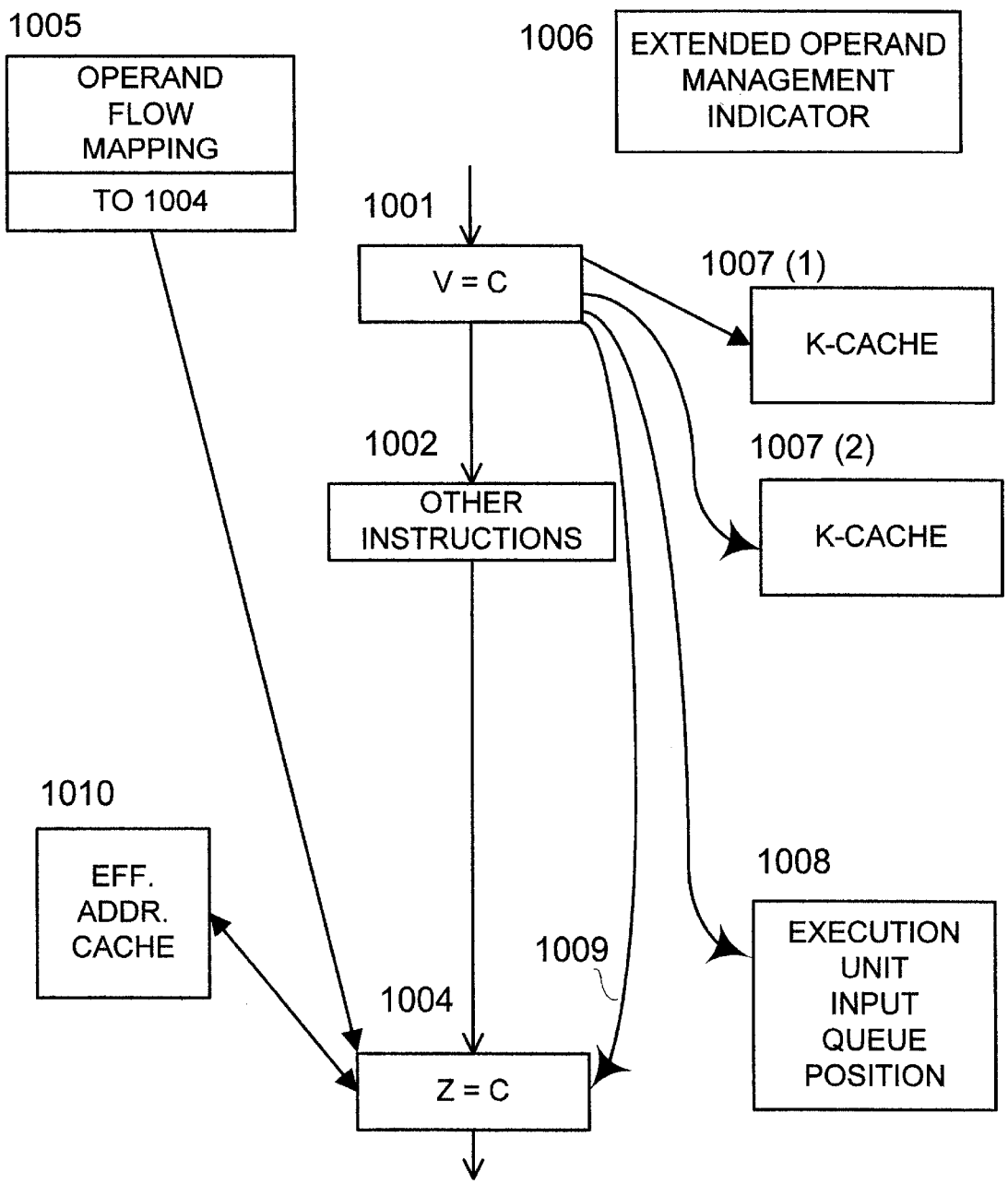
FIG. 10 shows use of constant caches.

The variable named C is loaded in FIG. 10 by an instruction 1001 and also by an instruction 1004. This access pattern is sometimes called a Read-After-Read (RAR) dependency. The processor can elect to replicate the value of C in some number of k-caches 1007 (only two are shown in FIG. 10). The processor could also determine after a first, mapping-mode execution that after being used by instruction 1001 in subsequent executions, the value of operand C will be needed again quite soon by instruction 1004. After determining the closely grouped use of operand C, the processor elects to create a flow mapping 1005 so that subsequent executions of instruction 1001 would load the value of C from one of the available sources and forward that value to instruction 1004. That forwarding could trigger execution of instruction 1004, or if there were a number of instructions intervening between instructions 1001 and 1004, the value would await issuing of instruction 1004. Even if instruction 1004 is not triggered, a forwarding can eliminate the delay of having to compute the address of operand C. An alternative embodiment, instead of forwarding the value of C to instruction 1004, would place its value in an input queue 1008 of a selected execution unit so that the value would be available when instruction 1004 is issued. It will be necessary to record the decision about how operand C will be handled in an extended operand management indicator 1006. This indicator will be consulted during execution of target instruction 1004 to determine from where it should input its operand value(s).

Operands are classified by the processor as read-only by noting the input of an operand that has not been annotated as being the output of any instruction. The processor can also consult memory management facilities such as TLB entries to see that an operand resides in a memory area that is designated (protected) as read-only. Operands residing in input buffers might appear to be read-only because they are used as instruction inputs but do not appear as instruction outputs. In some computer systems, some operating systems software may mark input and output areas as non-cacheable in memory management facilities and this marking can be used to determine that operands in such memory areas should not be placed in k-caches. In some processor designs it may be feasible to have peripheral controller input engines (DMA devices) annotate the memory areas they alter. Flow mappings Would then be created and, in later executions, operands forwarded and target instructions triggered by execution of DMA input operations (which have system memory as their output). It might still be appropriate to perform read-after-read forwarding of operand values in input areas if there is no chance of the intervening input activities changing the values stored in those areas.

Another alternative embodiment for operands that are truly constant (e.g., residing in read-only, protected storage) stores the constant operand value within the extended operand 1o management indicator along with its Constant policy indication. This form of extended operand management indicator store is indexed by the address or cache address of the receiving instruction. A separate extended operand management indicator, indexed by operand address indicates that this operand is considered a constant and should an authorized program (such as operating system software or device driver) attempt to change the operand's value then the constant indicator must be nullified.

As noted above use of constant values is prevalent for addresses. Address constants (e.g. for operands in program 'global' areas are noted in extended operand management indicators. Though, in this case, the address of the memory operand is constant, the operand might be frequently updated as would be the case for a 'static' variable. Storing an address constant value with the extended operand management indicator speeds execution by avoiding the delay of computing an effective operand address. Storing this extended operand management indicator indexed by the address or cache address of the memory accessing instruction allows early retrieval of the indicator and memory address to speed access to cache for the load or store or other memory accessing instruction. Access to cache is additionally speeded for associative cache by carrying with the extended operand management indicator the cache set number as well as the line number within the cache. This technique saves or defers the checking tag bits for reaccessing the operand in cache memory. An alternative embodiment would save storage by storing frequently computed addresses in K-caches if they are constants or in Effective Address Cache 1010 in FIG. 10 if not. Effective addresses are computed when an operand at a particular address is first accessed. An extended operand management indicator 1006 accessed with the accessing instruction 1004 directs execution of the instruction to make use of a particular saved effective address which might also hold the operand's cache line and set information to further speed cache access.

Deriving Flow Maps from Renaming

Figure 11:
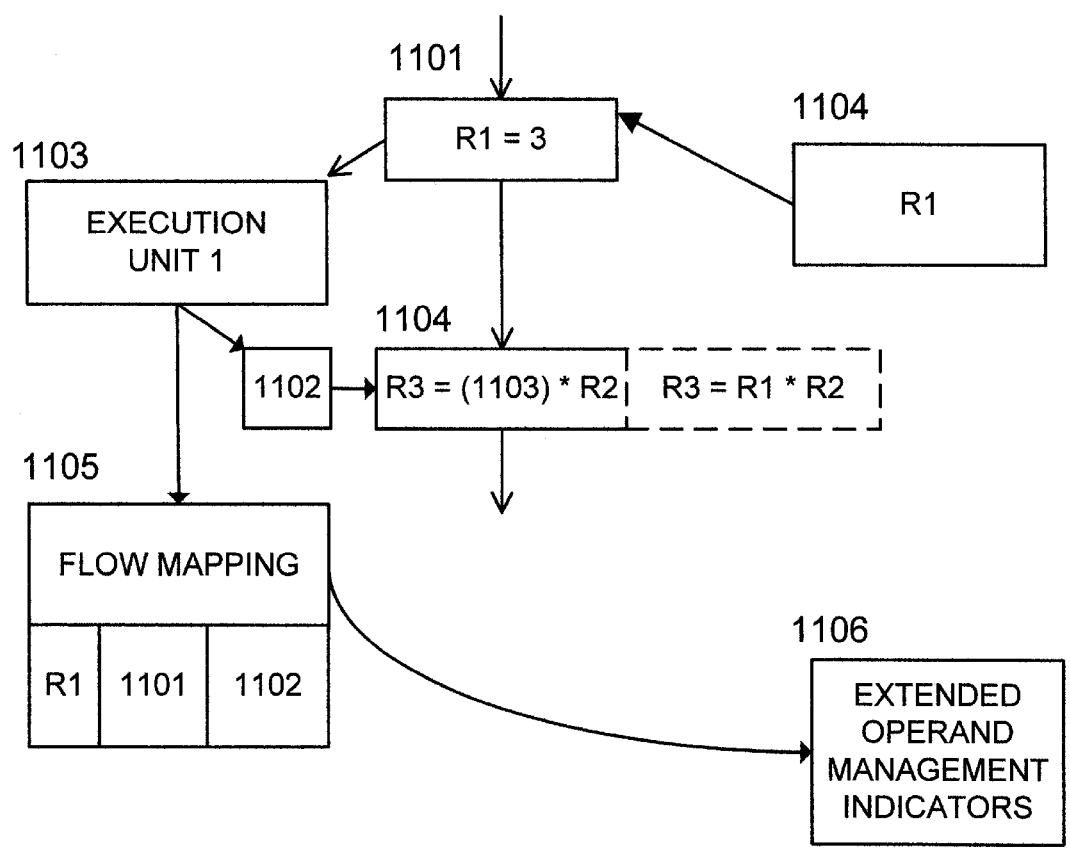
FIG. 11 shows operand renaming.

Common superscalar processor designs today use renaming schemes for register operands so that instructions may be executed out-of-order while maintaining correct dependencies between instructions. In FIG. 11 an instruction 1104 uses operand R1 as input but this operand has been renamed 1102 to be the output of execution of an instruction 1101 by an execution unit 1103. Output of the execution 1102 will be forwarded to instruction 1104. This renaming is a form of flow mapping. Prior art processor designs discard this flow mapping information but these designs could be extended to capture the dependency flow information in flow mappings. A flow mapping 1105 in FIG. 11 stores dependency information showing the R1 operand value flowing from instruction 1101 to 1104. Flow mapping can be used in subsequent executions of the same sequence of instructions to forward the computed operand value from instruction 1101 to instruction 1104. Extended operand management indicators 1106 inform the target instruction 1104 whether its input value is included in forwarding packet 1102 or if it resides in a transient value cache (not shown in FIG. 11 for simplicity) or is resident in a register file or some other value store. The prior art renaming mechanism can thus be modified to capture some operand flows even without explicit annotation of the operands. Renaming might also be applied to memory operands where a store instruction is followed by a load of the stored value within the execution window of the processor. Capturing operand flows without explicit operand annotation allows application of many of the enhancements of the present invention but the operand flows involved are limited to instructions that execute together in the same window with the further limitation that the flow target instructions obtain their input operands from renamed computations instead of from architected locations such as register files or data caches that are not annotated with instruction sources.

Inter-CPU Operand Flows

Many computers include multiple CPUs that operate on a common memory—multiprocessors. Each CPU can be executing different programs or sometimes the same program. The CPUs typically do not share registers. They share the main memory and sometimes some levels of cache memory. So long as they do not update common areas of memory, there should be no discemable effect on the correctness of the results of the programs executing on separate processors. When multiple CPUs undertake to update the same memory areas then careful coordination is required to produce predictable results. It is common programming practice to place a claim on an area of memory by storing an identifier for the thread, process, or CPU into a memory area that acts as a lock for another memory area. The second memory area or areas contain the data protected by the lock. It is not sufficient to merely load a memory lock word to ensure that some other thread has not reserved it. In that instant of time between fetching the current value from memory, comparing it (perhaps for zero meaning free), and storing this thread ID into it, some other CPU could have carried out the same sequence of operations and may have stored a different ID into that lock word. The programs in both CPUs would then continue executing as though they both own the storage protected by the lock word. To avoid this, many processor implementations provide an atomic change instruction. This is often called Compare And Swap. Compare And Swap will compare the value of an operand with an area in shared memory in an interlocked fashion: No other CPU will be able to store into that memory location while the Compare And Swap is accessing it. Compare And Swap is said to be an atomic access to the memory operand. The processor design and/or the software must arrange that the lock word subject of a Compare And Swap instruction is actually accessed from a shared level of memory instead of from private caches where two processors could otherwise reflect two different realities. Use of Compare And Swap for locking is based on the honor system. A rogue or erroneously coded program could easily just begin using a memory area without exercising the locking discipline, which is based on common agreements for sharing.

Figure 12:
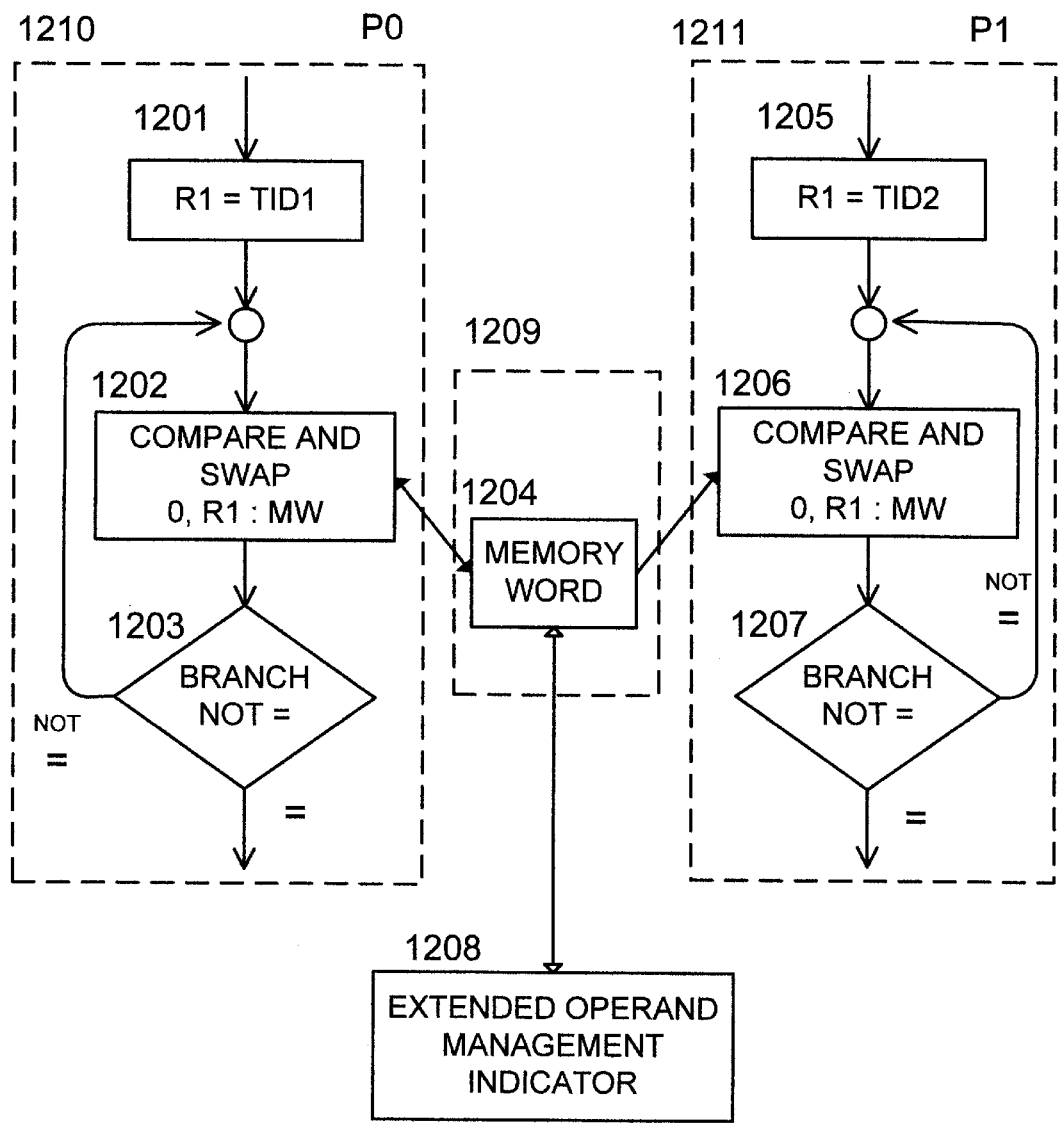
FIG. 12 shows interlocking of operands.

In FIG. 12 two different threads are executing programs simultaneously on two different CPUs 1210, 1211. Both programs appear to be the same but could just be common instruction sequences used for the same task: obtaining an exclusive lock on a shared word of memory. An instruction 1201 and an instruction 1205 in the respective CPUs load different values into their respective R1 operands. They each then proceed to Compare And Swap the memory word operand 1204 with zero (meaning free). Only one can succeed. In the example in FIG. 12 an instruction 1202, executing in processor 1210, accesses a lock word 1204 first. Winner instruction 1202 will store its signature from R1 into memory word 1204, fall through a branch 1203, and continue executing from there. A loser 1206 executing in processor 1211 will loop through a branch 1207 back to its Compare And Swap 1206. Right processor 1211 will continue in this tight loop until some other processor, such as processor 1210, restores memory word 1204 to the value needed by 1206 or until an interrupt signal (possibly a timer expiration) interrupts processor 1211. Processor 1211 will loop, 'spinning' on spin lock, memory word 1204.

Spin lock operations with instructions such as Compare And Swap (or other interlocked access such as the x86 Bus Lock instruction prefix or the Fetch And Add instruction) operate on memory words. Spin locks are used in operating system programs and occasionally in application level programming where it is desired to coordinate sharing of resources (such as memory) among multiple threads of execution. Since the number of spin lock memory objects is typically not excessive, it is feasible to annotate such an operand 1204 with an extended operand management indicator 1208 specifying that this operand has been subject of a spin lock operation. This operand management indicator can be further extended to indicate from which processors it has been accessed. If extended operand management indicator 1208 is shared across all CPUs that can share the memory then this can be made to cause CPUs to divert accesses (e.g., loads, stores, and Compare And Swap instructions) to a special Spin Lock Cache 1209.

Spin locks are expensive. Programmers are cautioned to use them and interlocked memory access instructions such as Compare And Swap only sparingly. They cause the processor to synchronize its operations, actually access, and wait on the very slow main memory. The processor's faster local cache cannot be used for spin locks. It is difficult to design a processor so that Compare And Swap can be executed speculatively since it causes an action to main memory that might cause another processor to enter a spin lock loop when it could turn out that the program in the first processor actually followed a prior branch path that was mispredicted so that the first processor should never affect the spin lock. But a specially designed spin lock cache could allow a value to be speculatively stored into the cache and then discarded if the Compare And Swap turns out to not be on the actual taken branch path. The prior value could then be restored from main memory or could be held in the spin lock cache. Spin locks are pessimistic. Processors don't often contend for a spin lock (they are usually free) but to protect shared resources the software must make sure. This insurance is expensive because the spin lock cannot be accessed in fast, private cache but requires a high latency access to main memory. A special spin lock cache should not be often accessed (programs avoid taking spin locks) so it could be fast but have few expensive read or write ports. Thus the common case where a processor succeeds in obtaining a requested spin lock can be made relatively fast and speculative so long as the speculation cancels the lock on a mispredict, quash condition when it didn't need the lock after all.

Use of extended operand management indicators along with spin cache allows speculative access to a spin lock—speeding the out-of-order execution of instructions before and after the Compare And Swap while allowing deferral of the actual cross-processor locking until retirement (commit) of the Compare And Swap instruction. A spin cache can even provide a hint back as to whether the lock is likely to be free and, in a speculative machine, that hint can be used to predict the direction of branches following Compare And Swap instructions.

Multiple Virtual Processors

One of the expensive aspects of a spin lock is when there is contention. A losing processor will spin in a tight loop, accomplishing nothing. Processors also often wait for long latency operations such as accesses to main memory. An approach to the problem of long latencies being marketed by Tera Computer of Seattle is to have the processor multi-thread at the hardware level—pretending to be multiple processors. While an access is being made to main memory the physical processor has shifted to the next thread and issues a different instruction, very likely from a different program. After issuing N−1 instructions on behalf of other hardware threads the processor returns to the first thread in time to use the now loaded operand.

If, as taught in U.S. Pat. No. 5,974,538, most of the execution of programs were done by forwarding of operands and triggering of recipient instructions then latency tolerance could be extended by annotating the actual operand forwardings and results with virtual processor identifiers. A maelstrom of operands and results is saved from chaos by the tagging of each with a virtual processor ID. When a virtual processor ends up waiting for a slow operation, the physical processor's resources can be employed by other virtual processors. This sharing of processing capability need not be in a fixed, round-robin or barrel shifter fashion but would be on a dynamic basis so that for brief periods one virtual processor out of ten might consume 90% of the processing power but then be delayed waiting for an input operand.

Still referring to FIG. 12, processor designs could detect spin lock situations and determine from flow mappings that a spin lock would not be able to escape its spin loop until spin lock object 1204 is altered by some other virtual CPU. Other virtual processors will be alerted to this situation through settings in extended operand management indicator 1208. Virtual processors can also use special spin lock cache 1209 instead of accessing the much slower main memory. In systems where there is only a single physical CPU a copy of the spin lock object can reside in one of the data caches but a special cache might still be preferred since it could allow changes by speculatively executed instructions that would revert to the correct value on discovery of a misprediction and would not affect the operation of other processors until the speculated value is confirmed as committed. When a virtual processor is discovered to be in a spin lock loop that will change no data and will not stop looping until the spin lock object is changed by some other agent then execution of the spinning virtual CPU can be suspended until the lock object is altered or interrupted. This enhancement would dramatically lower the cost of contention since the virtual processor would not be consuming computational resources. It would be hibernating to reawaken when another processor changes the spin lock object or until interrupted by a timer or other interrupt.

In a multiprocessor system, some operands, like registers and condition codes, are private to each processor while some operands such as those resident in main memory are shared. Therefore, among virtual processors at least the private operands need to be labeled with the identity of the virtual processor to which they belong. It might be preferable to label all output operands with the identity of the virtual processor on whose behalf they are executing. This labeling could be stripped from shared (e.g. memory) operands as their source instructions are committed. This may ease the implementation of speculative execution for stores and other instructions affecting shared operands.

Figure 13:
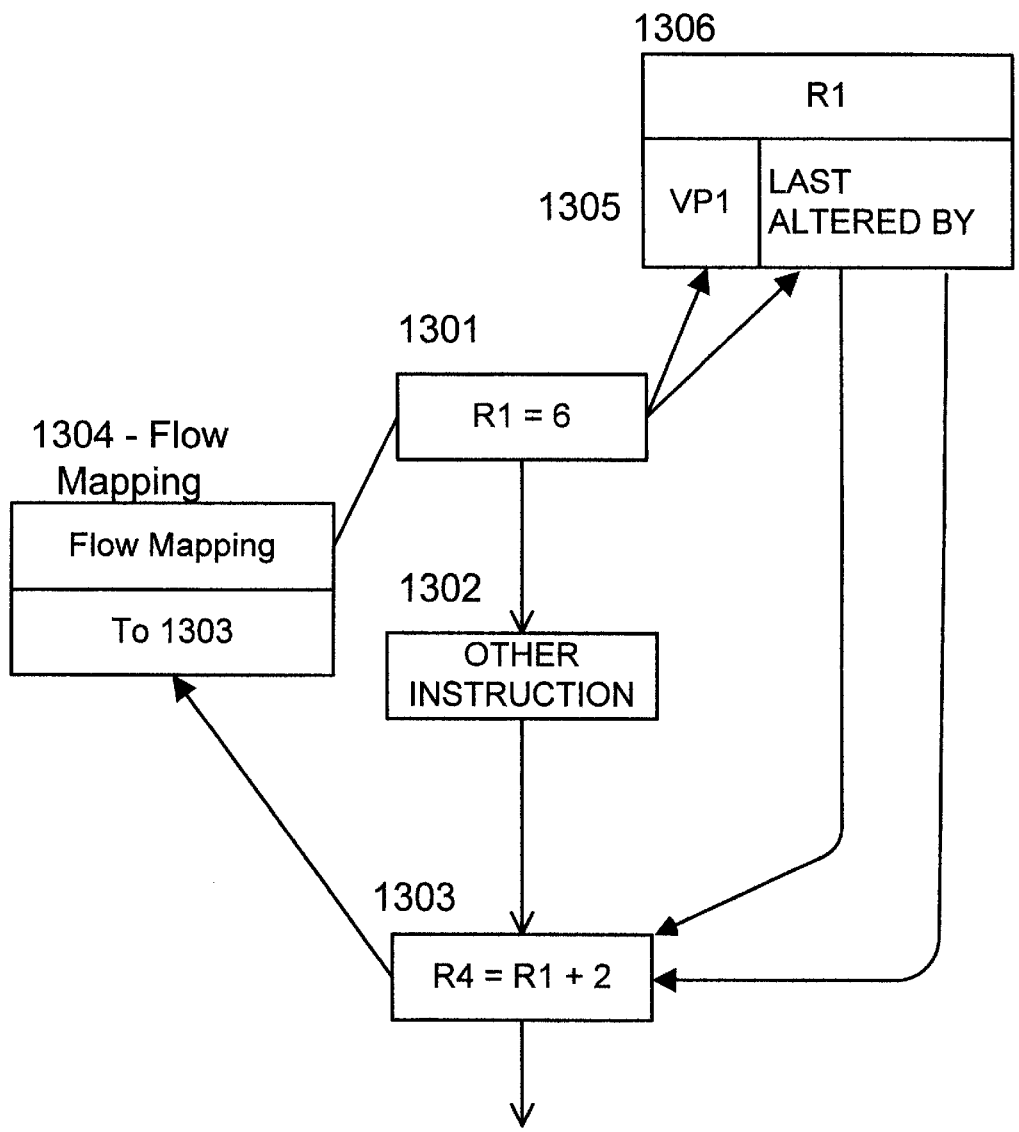
FIG. 13 shows virtual CPUs.

In FIG. 13, an R1 output operand 1306 of an instruction 1301 has been annotated with a VP1 virtual processor ID 1305 in an extended operand management indicator 1306. This identity can be propagated into an output of instruction 1303 to keep the outputs of different virtual processors distinguished. A flow mapping 1304, on the other hand, is not labeled by virtual processor ID since the flow mapping is a property of the program execution and should apply even if that program is being executed on a different virtual or real processor. When execution of a virtual processor is suspended, many of its private resources, such as values of registers and control registers, can be migrated to less expensive storage, perhaps to a designated area of main memory or cache memory. In a processor designed to use out-of-order operand forwarding there should be many operands simultaneously in transit between instructions on behalf of each active virtual processor. Output operands can be gathered into retirement containers for parallel commit of results. This is where outputs are materialized to register files and cache memories or forwarded as committed (non-retractable) values to the next retirement container. The retirement process would appear to be simpler if retirement containers were segregated by virtual processor ID instead of mixing results from different processors. This might also require fewer simultaneously active interconnections for writing back to register files.

Operand Flow as Branch Predictor

Figure 14:
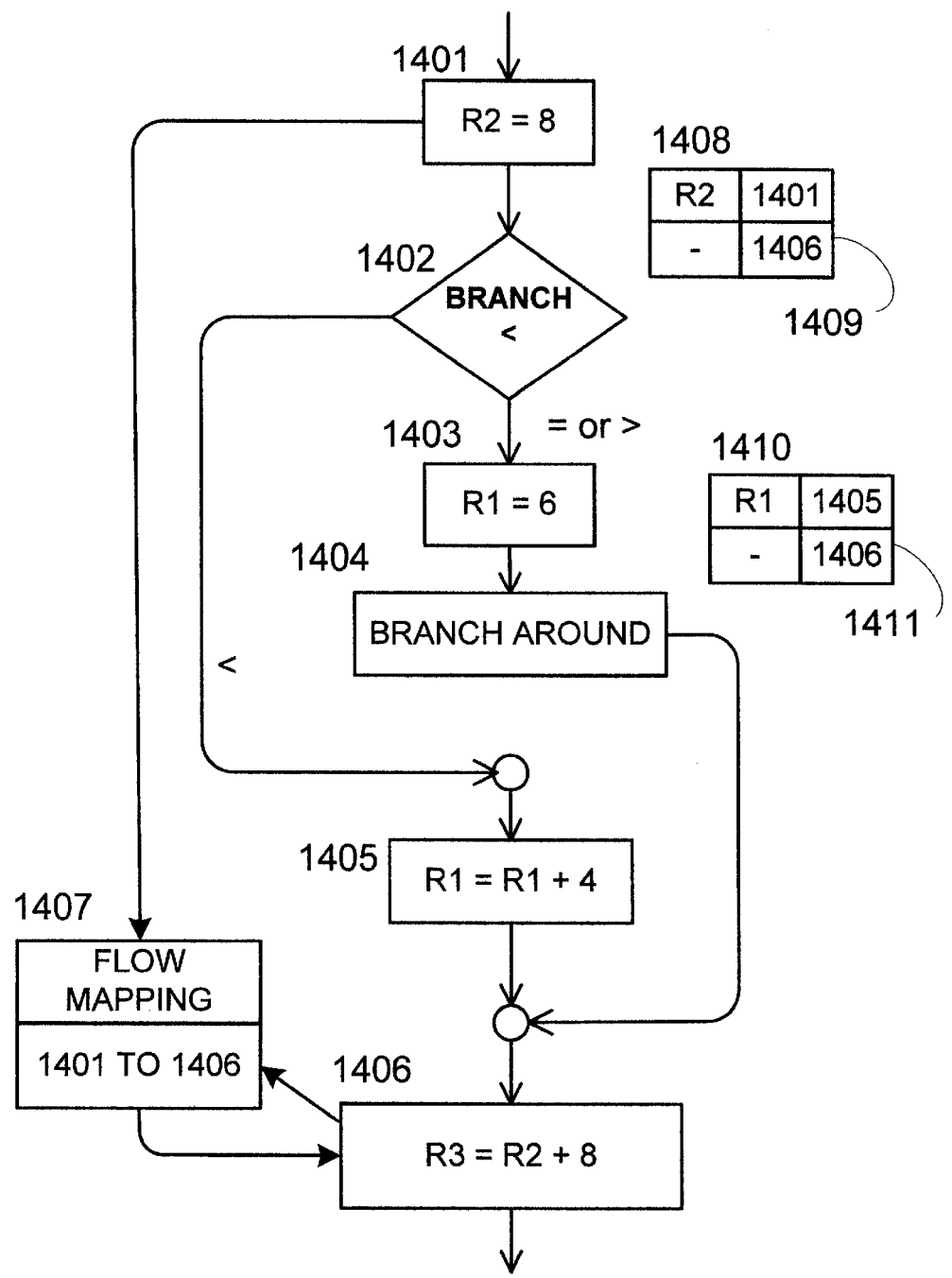
FIG. 14 shows flow mapping through hammock code.

If operands are annotated and the operand flows mapped as in U.S. Pat. No. 5,974,538 then the processor can often determine future flows of control past some number of conditional branches without regard to predictions of branch directions of individual conditional branch instructions. Referring to FIG. 14 a flow mapping 1407 has recorded from a prior execution that operand R2 flows from an instruction 1401 to an instruction 1406 regardless of the directions of intervening branches that were examined in prior execution for updates affecting R2. To accomplish operand flow mapping, operand R2 has been annotated in a set of extended operand management indicators 1408 that indicate the last source of the operand's value. Flow mapping 1407 for R2 from instruction 1401 to instruction 1406 has been constructed so that subsequent executions of instruction 1401 will immediately forward the new R2 value to instruction 1406 which will be immediately triggered or enabled for execution.

U.S. Pat. No. 5,974,538 teaches that operands can be annotated with branch histories since their last change. This can be streamlined by extending the operand annotation with a bounded set of branches. Operand management indicator set 1408 in FIG. 14 has been extended to include a farthest back and a farthest forward branch annotation 1409. There have been no backward branches since R2 was updated by instruction 1401 so the back branch annotation is shown as null while the forward branch annotation is shown as instruction 1406 because instruction 1404 branches to instruction 1406. This form of branch bound annotation can easily accommodate more complex code constructs. There might be any number of instructions in place of instruction 1403. The program sequence shown in FIG. 14 is sometimes referred to as a hammock. In higher level languages, this is written as an IF do something ELSE do something else. So there is a left, IF side and a right ELSE side as two sides of a hammock. Not all IFs have ELSEs. The branch bounds annotation 1409 shown in FIG. 14 can handle program code where there are numerous levels of hammocks and/or single-sided IFs so long as the full scope has been mapped to discover instructions that could update the subject instruction or branches that could send execution far from the scope of the code being mapped. After annotating an update 1401 there may be conditional branches with branch targets beyond the point of current execution and mapping. Forward branch 1402 would cause forward branch annotation 1409 to be set to instruction 1405. Upon executing instruction 1403 it is not known from annotation 1409 that instruction 1406 is the eventual destination of control flow regardless of the direction taken by branch instruction 1402. For this scheme to function correctly the processor will either need to map intervening program code between taken forward branches and their branch targets (such as instructions 1403 and 1404 when taking the < branch path of instruction 1402) or will have to wait until all possible branch paths have actually been taken (requiring some number of iterations as well as some luck).

The scheme described above can work even for processors that execute from fixed execution windows so long as they annotate the operands in extended operand management indicators with source instruction identities and branch bounds and examine intervening instructions for branching and updates to subject operands. Operands that might be updated by instructions in conditional code can only predict future paths of control flow from that update forward or via the conditional branch preceding the update. If, in FIG. 14, instruction 1403 is executed to update operand R1 then it is determined that instruction 1406 and beyond at least to the next conditional branch will be executed. This is not as good a predictor in those circumstances as instruction 1401, which can determine (after mapping by initial execution and hammock exploration) that instruction 1406 will surely be updated. Farthest determination of future control flow from a given point forward through mapped code can be made by examining extended operand management indicators 1408, 1410 and selecting that one having the farthest forward branch bound with no back branch bound to an instruction preceding the source instruction for that operand. In other words, an extended operand management indicator with a forward branch bound spanning a loop can be used for future path determination if the loop does not branch back before the operand source instruction. Thus path determination can skip over loops. If, in FIG. 14, there were a loop contained in the instructions between instruction 1402 and instruction 1405 and the entire scope of the loop were contained therein then operand R2 would still reach instruction 1406 and the control path of instructions that should be executed will also reach instruction 1406 so long as that contained loop is guaranteed to exit. Taken over all available flow-mapped operands the maximal determination of future control path will often exceed in distance and accuracy the best obtainable branch path prediction available with today's branch prediction methods that ignore operand flow information.

Operand management indicator branch bounds can be extended further to help in branch path prediction. Computer programs should check for exceptional conditions and should not produce incorrect results. In regular use, these exception conditions may be rare but the tests for deviations such as divisors being zero or invalid inputs are made just in case. Many conditional branches are to handle such exception conditions. Other conditional branches evaluate normal variations. Speculative operand forwarding and branch prediction can be helped by distinguishing the different types of branches and by tracking which branches have actually ever been taken.

Figure 15:
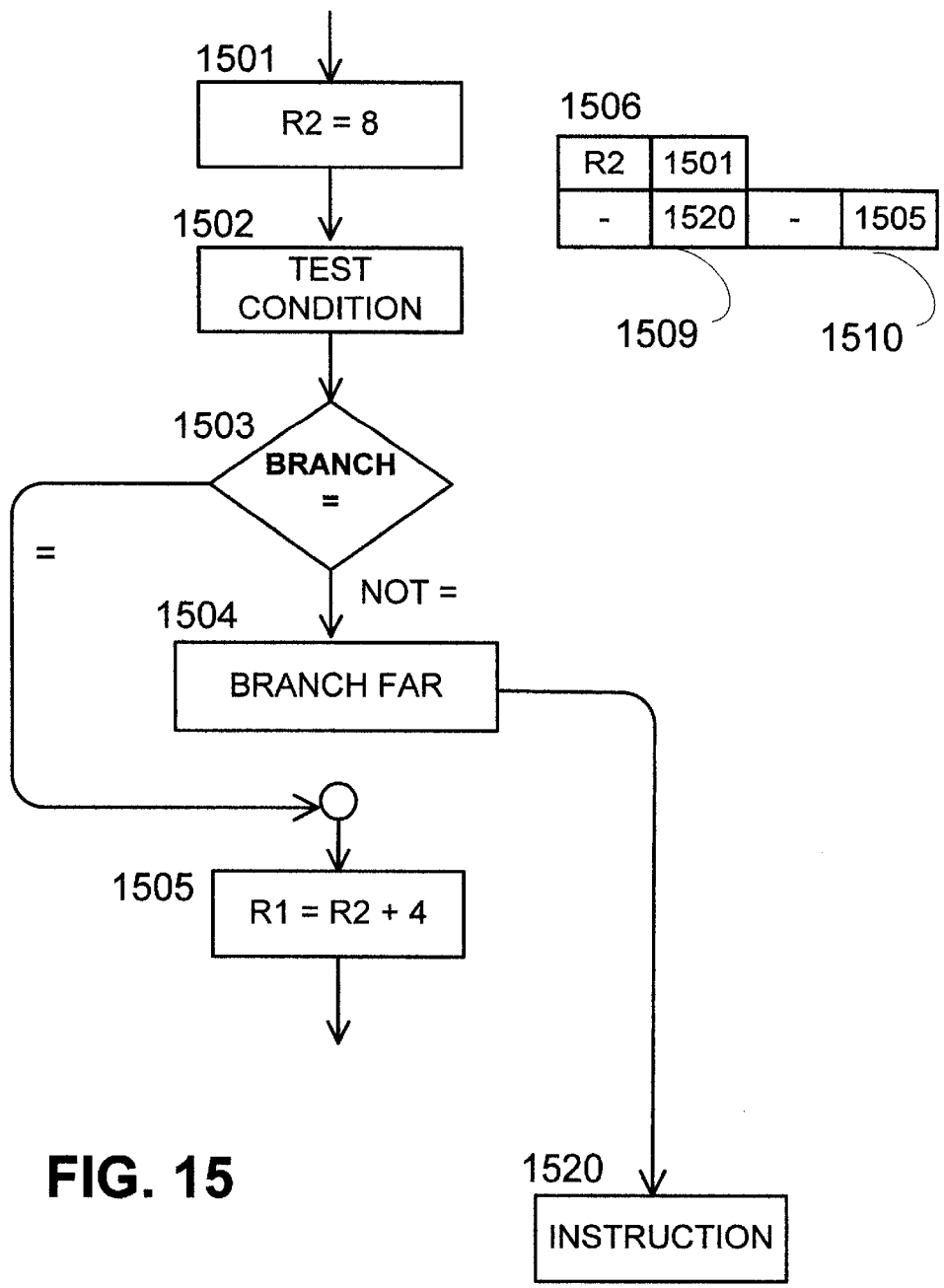
FIG. 15 shows branch prediction.

In FIG. 15 an extended operand management indicator 1506 for the R2 operand has been further extended to include a farthest forward branch encountered 1509 since update of R2 as well as a farthest forward branch actually taken 1510 since R2 was last updated. A far branch 1504 has been encountered but has not in any of its executions yet been taken and can be temporarily assumed to branch to an exception routine that is unlikely to be branched to. If the processor is capable of Speculatively forwarding operands then it can create an operand-forwarding map 1511 to Speculatively forward operand R2 from an instruction 1501 to an instruction 1505. In subsequent executions, if branch instruction 1504 remains untaken then operand R2 will be speculatively forwarded to instruction 1505, which can be triggered for speculative execution. This speculative execution of 1505 may cause further speculative forwarding and triggering of instructions using operand R1 as input. All results of the speculative forwarding and chain of further forwardings and triggered executions would be treated as speculative until a speculated branch 1503 has been resolved and committed. If branch 1503 is not taken and execution falls through to unconditional branch 1504 then these speculatively computed values are discarded.

Predicated Operands

Many modem processors implement predicated instructions where a test of a predicate condition can set a predicate indicator. For these machines, compiler software can produce code that will predicate the completion of some following instructions on the value of the predicate. The processor hardware can execute the predicated instructions before knowing the result of the test condition but discard the results of that execution if the predicate turns out not to match the required condition. The same effect can obtained for machines that do not have predicated instructions in their instruction set architecture by maintaining phantom predication operands that can flow to instructions that are annotated as being predicated after a first execution and mapping of operand flows.

Figure 16:
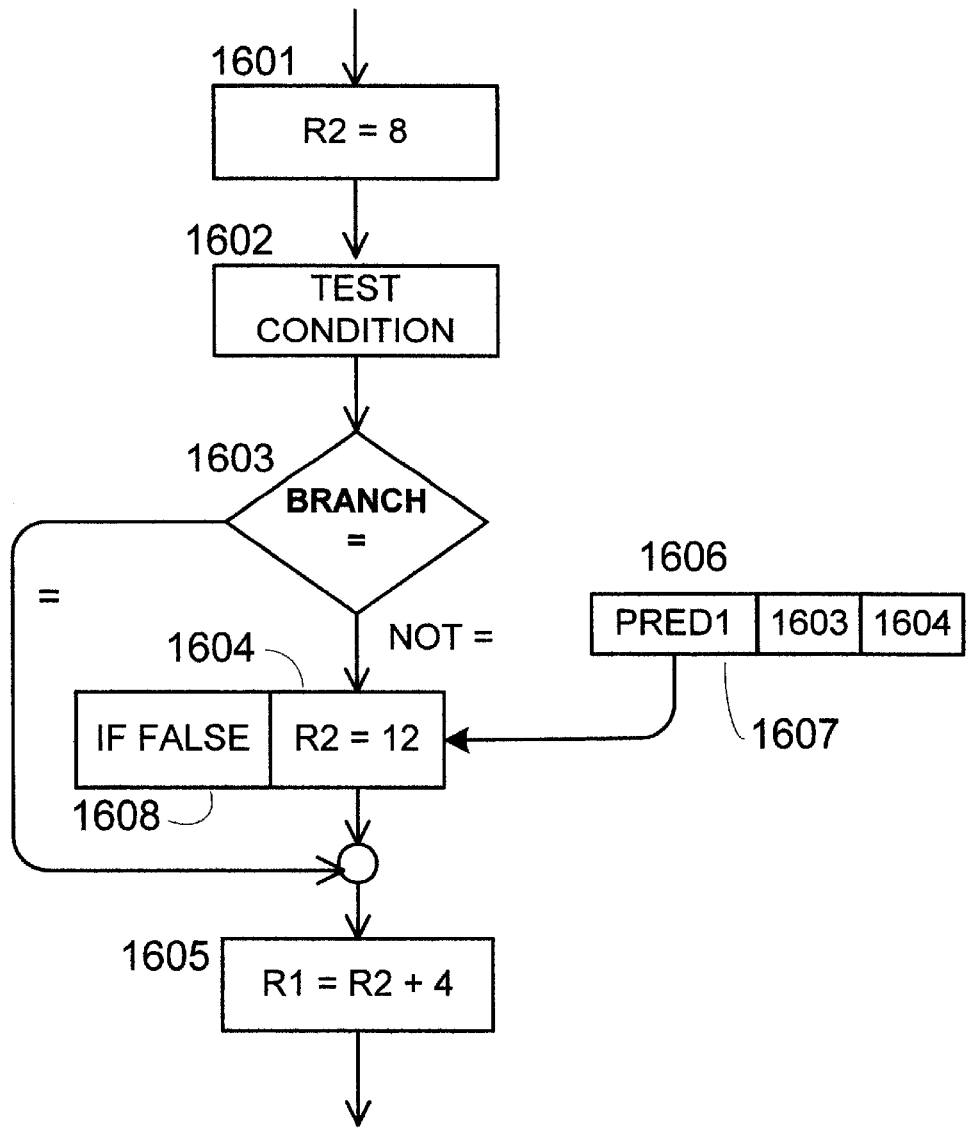
FIG. 16 shows predicated forwarding.

FIG. 16 depicts a code segment that has been annotated by initial execution, A predicate condition is tested by a test instruction 1602 and, based on that test, a branch instruction 1603 branches around an operand setting instruction 1604. An extended operand management indicator 1606 of a predicate PRED1 1607 maps its flow from a branch instruction 1603 to instruction 1604. PRED1 1607 is not accessible to normal software in the processor. It is a 'phantom' operand that the machine can use to avoid the need for branch prediction. Branch instruction 1603 can be nullified and operand-setting instruction 1604 has been predicated 1608 so that it now has an additional input of PRED1 1607 which will flow from the nullified branch (or equivalently from the test instruction 1602). If the predicate is true (test=) then the output of operand setting instruction 1604 will be nullified, will not flow to a next instruction 1605 and will not be materialized. If, on the other hand, the test condition is false (not=) then a 'false' value of PRED1 will flow into instruction 1604 and its result will be materialized as a new value of operand R2 and this value will flow into instruction 1605. FIG. 16 shows only a single instruction as being predicated by annotation but it could be a long string of instructions and could even include other, nested IF . . . THEN constructs which would be predicated on other 'ghost' predicate indicators., If the instruction set architecture does feature predicated execution then the processor will not need to 'fake' this capability but can still improve on the execution rate by annotating flows of predicate registers from predicate setting instructions to instructions whose execution is predicated on those settings. If the instruction set architecture allows independent setting of individual bits within a container predicate register then execution rate can be speeded by annotating flows for those independent bits.

Avoiding Stack Pointer Serialization

Many computer designs provide instructions such as PUSH and POP to manipulate data on stack structures. Even in computers where stack manipulation instructions are not offered as instruction primitives, compilers and other software very often fabricate and manipulate stack data structures. One popular method for doing this is to use a general/address register as a stack pointer. Operands and the return address are pushed onto the stack before calling a function or subroutine. Typically, to compile code for calling a function, a compiler will generate code to allocate memory for function operands and a return address on a stack and deallocate the space upon function return. If there are no stack primitives then the compiler will use a general/address register. Allocation of space for the function activation area might be generated by:

STACK_REG=STACK_REG—SIZE_OF_ FUNCTION_RECORD;

Where STACK_REG might, by convention, be register 13 or register 29 or other register designated by programming convention. Stacks are often grown downward as here. Function input operands are then placed in the skipped over (allocated) space. In code at the end of the called function the compiler places an add instruction to bring STACK_REG back to its value before this function invocation. If the called function also calls itself or other functions, then similar code will be generated to allocate stack space beyond that for the first invoked function. Whether or not the called function makes further function allocations, STACK_REG should be pointing to the same memory location as before the first function invocation. All intervening function call allocations will have been unwound/deallocated by the matching, offsetting function return actions.

After a first, mapping-mode (or prior profiling) execution, the flow of operands from their originating instructions to target instructions within a called function can be mapped as described in U.S. Pat. No. 5,974,538. These forwarded operands can flow to their targets in parallel, as they become available. They need only wait for the operand values to be computed by execution of their source instructions. Decreases and increases of STACK_REG however form a chain of dependences between the stack manipulation instructions that will serialize their execution. To ensure correct stack arithmetic, the machine must execute each stack manipulation instruction in order. This will be a bottleneck where function or subroutine calls are at all frequent and they are quite frequent in modern programming.

Figure 17:
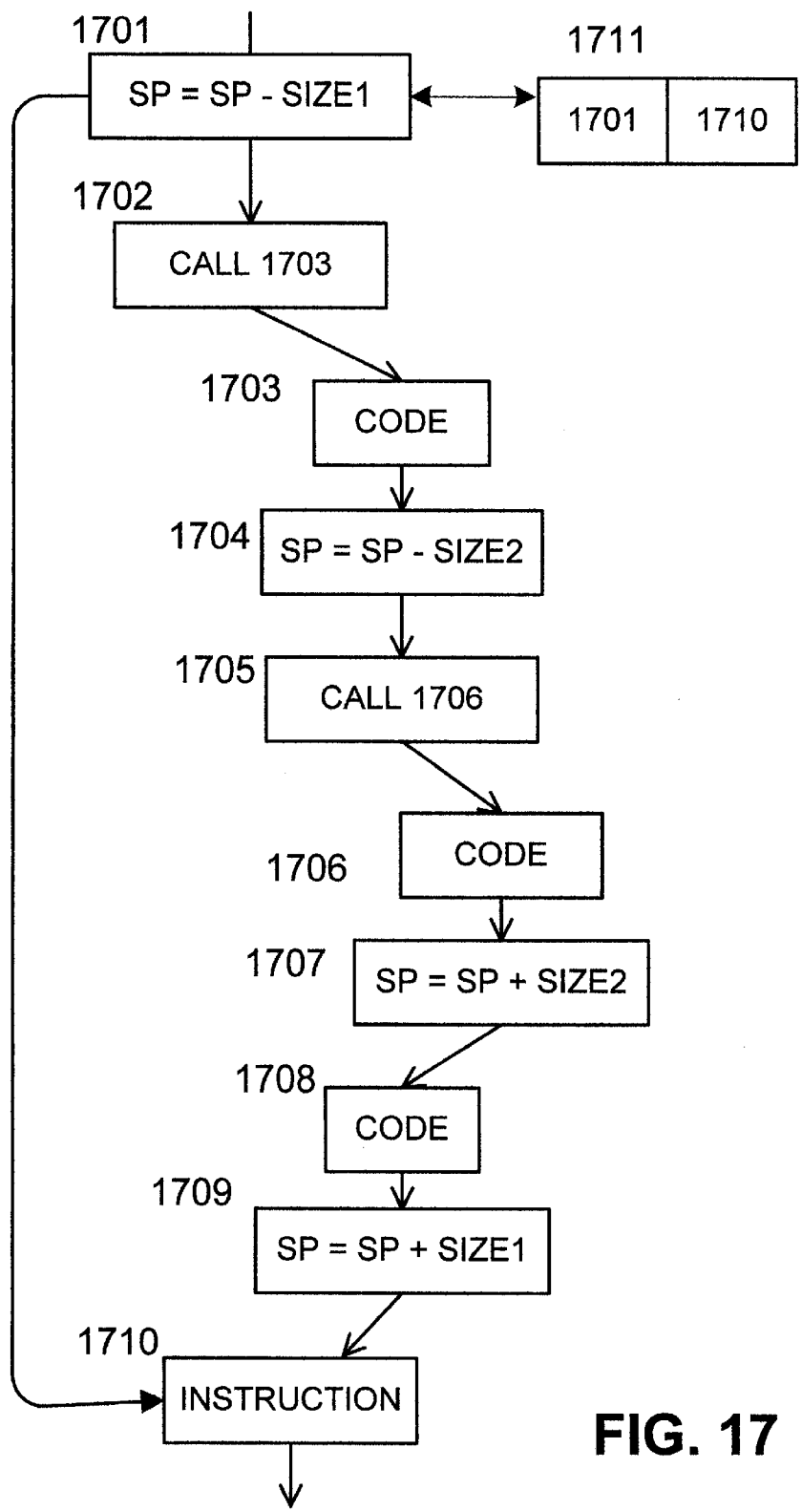
FIG. 17 shows stack pointer forwarding.

In code where in prior execution(s) the processor has fully mapped the operand flows through a chain of function calls, so as to avoid accessing operand values from memory, the stack dependence chain bottleneck can be skipped by forwarding stack pointer values around function invocations. An instruction 1701 in FIG. 17 has, from prior execution, been annotated in an extended operand management indicator 1711 to forward a current value of SP, the stack pointer register (before subtraction 1701), to an instruction 1710 skipping over intervening instructions, particularly intervening manipulations of SP. In this way code at the instruction 1710 and beyond that depends on the value of SP can be executed (but not committed if the machine architecture calls for in-order commits of instruction results). Instructions in FIG. 17 are shown in the order in which they would be committed even though the instructions in the called functions would not be stored contiguous to their calling instructions. Without this skipping, intervening instructions 1704, 1707, and 1709 would have to be executed in sequence, even though each forwards its results immediately to the other. Although only two levels of function invocation are depicted in FIG. 17, function calls are often much deeper than this and otherwise constitute a severe constraint to further scaling of parallelism and processor throughput that can be avoided with the present stack operand forwarding technique. The method and mechanism shown here is matching pairs of stack manipulation instructions so that decrementing (PUSH) instructions are paired with their matching incrementing (POP) instructions to determine where skipping is operative.

Figure 18:
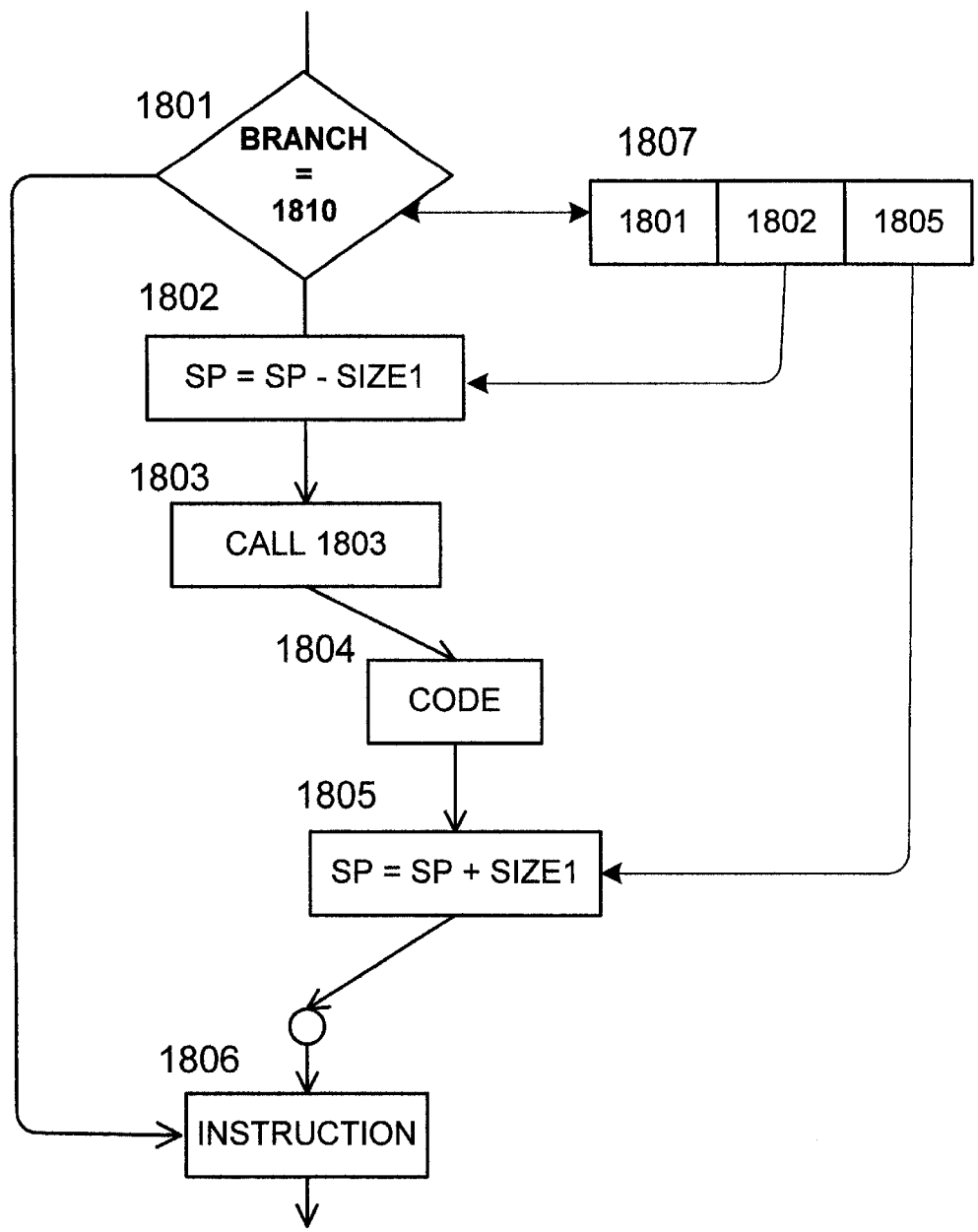
FIG. 18 shows conditional stack pointer forwarding.

Function invocation is often conditional. In FIG. 18 a conditional branch instruction 1801 may branch to an instruction 1806, skipping over an allocation of function invocation space 1802 and a function call 1803 and a function execution 1804 and a subsequent function space deallocation 1805. If all operand flows to code in the function 1804 have been mapped then that code will not need to be mapped and results of the stack manipulation instructions 1802 and 1805 will not be needed so execution of these instructions can be nullified where execution is following the previously mapped path of instructions. Invocation of function 1804 from other, unmapped instruction sequences would not be affected if the nullification is carried out in response to the indication in an extended operand management indicator 1807 which would only be signaled if the conditional branch 1801 is not taken (fall-through path).

Figure 19:
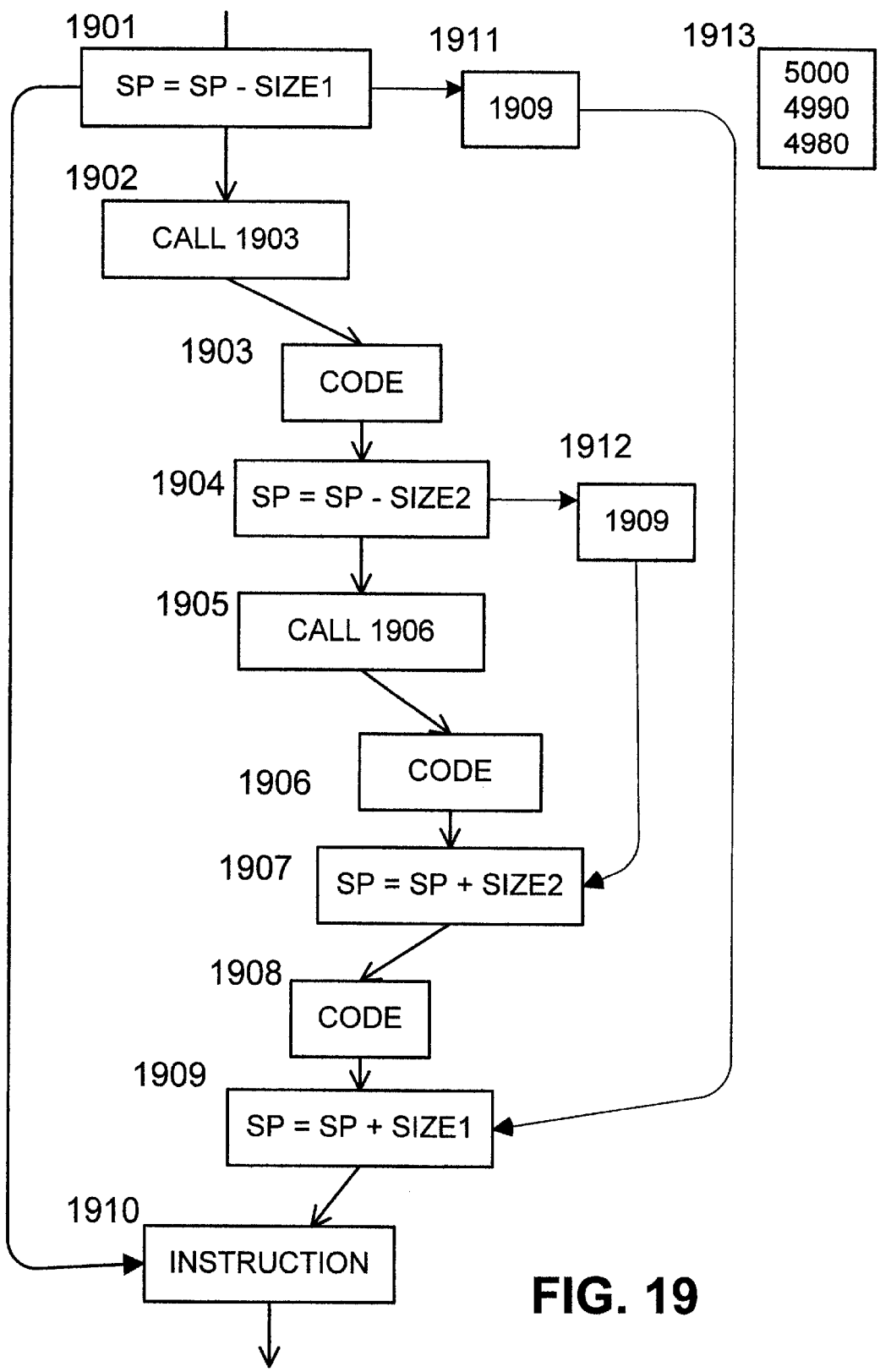
FIG. 19 shows nullification of stack pointer update.

In an alternative implementation, flows of stack pointer values would be annotated with extended operand management indicators signifying that, barring exceptions such as divide by zero, the operands should not be acted upon and their target instructions should not be executed. In a first, mapping mode execution stack allocation instructions are paired with stack deallocation (return) instructions and extended operand management indicators are used to signal nullification of both the allocation and deallocation instructions. In FIG. 19 a stack allocation instruction 1901 has been paired with a stack deallocation instruction 1909 as a result of previous execution in mapping mode where it was determined that deallocation instruction 1909 will always be executed if allocation instruction 1901 is executed. An extended operand management indicator 1911 indicates that both these instructions should be nullified barring exceptions. Another extended operand management indicator 1912 indicates that a stack allocation instruction 1904 is paired with a stack deallocation instruction 1907 and that this pair of instructions should also be nullified. Where an operand that appears, in mapping mode execution, to be a stack but where other, non-stacking instructions use that operand it can be computed and forwarded directly to that target instruction without triggering other, stack allocation/deallocation instructions. During the first, mapping mode execution a stack 1913 of values for the stack pointer, SP is used to ensure that stack deallocation sizes being added 1907, 1909 match the sizes of the matching stack allocation subtractions 1901, 1904. If these did not match then the nullification shortcut could not be used.

Accepting Compiler Hints

By adding one or more special instruction types to a computer's software-visible instruction architecture or by arranging special, processor-known locations in program load modules, extended operand management indicators can be preset even before the processor begins execution and exploration of the loaded program. Pre-setting of extended operand management indicators allows exploitation of knowledge gained by compiler software as it compiles a program. Profiling software can also be used to provide useful settings for extended operand management indicators. These settings can then be loaded by special instructions or added to special locations in the program load module with, for example, a link editor program. Profiles can be captured by special instructions included by the compiler in a profiling version of the program executable code or by executing the program with a software emulator that can capture good indicator settings or by adding one or more special instructions to the computer's software-visible instruction architecture to write extended operand management indicators to a file or designated memory location(s) from where they can be saved to a start-up file or program load module location.

Capture or generation of start-up values for extended operand management indicators would be quite beneficial since, once set many of the indicators seldom change. Current operand storage location might frequently change but loop-stride-forwarding distance should not, nor should the flow paths of operands from source loop to target loop. Indication that an operand is constant or nearly constant might also seldom change. Virtual predicates will frequently change values after they are created but their flows should not. Flow paths for stack position operands should also remain constant over repeated executions of a program even though the stack address values may vary as, for example, a code segment in a subroutine is invoked from different program locations having different stack depths.

Software Emulation

There are today a number of software emulations of other machines. Some are used for research, such as the SimpleScalar architectural simulator. Others, such as the many Java Virtual Machines and Postscript rendering printers, are used to enhance portability of executed programs. Transmeta Corporation is currently marketing several VLIW processors that use software to emulate the Intel X86 and JVM architectures.

Advantages accruing to direct hardware implementations of extended operand management indicators can be exploited by software emulating/simulating operation of 'virtual machines'. The manner of exploiting extended operand management indicators would often vary from that used in a superscalar hardware implementation. For forwarding between loops, an emulator program running on a VLIW machine might choose to pack the 'triggered' flow target instruction into an instruction group (long instruction word) immediately following the source instruction while the superscalar hardware implementation would trigger execution of the target loop instruction. Both implementations would rely on extended operand management indicators to discover the loop forwarding to be exploited. A software emulation can use resources on its underlying host that might be absent from the emulated architecture. If the underlying host has predicated execution then the software emulator can emulate the virtual predicates disclosed above for a hardware implementation.

Larger Machines

Extended operand management indicators coupled with partitionable and distributed operand stores can realistically be implemented as other chips or boards. Boundary crossings are not very important because after initial mapping-mode, executions interactions are deliberately localized to one or a small subset of processing elements. Extended operand management indicators and operand flow mappings can be replicated or partitioned as needed. Since they seldom change, there is little need after their initial setting for propagating new settings. Forwarded results need not be immediately used so performance of the microarchitecture of the present invention is less sensitive to latencies than most computer microarchitectures. The present invention therefore scales more easily to larger numbers of execution units even if those units be located on separate chips or separate circuit boards.

Standalone Software Generation of Extended Operand Management Indicators

Initial settings for extended operand management indicators can also be generated by separate software that analyzes the executable code of programs and generates settings for extended operand management indicators for that code. Such settings can then be accessed and used by processor hardware using the methods of the present invention.

Preferred Embodiment

In the preferred embodiment extended operand management indicators are set during initial, mapping-mode execution of segments of program code. Extended operand management indicators are subsequently used to:
1. Manage operands in various storage means including one or more of K-caches, transient value caches or execution unit input queues.
2. Determine and manage operand-forwarding horizons that limit possible floods of forwarded operands.
3. Determine and manage forwarding of operands among multiple iterations of program loops.
4. Determine and manage forwarding of operands between different program loops.
5. Determine and manage inter-CPU serialization operands.
6. Manage spin caches storing inter-CPU serialization operands.

7. Realize and manage virtual CPUs that have substantial degrees of spin locking.
8. Determine and manage predication of conditionally executed instructions and speculatively forwarded operands.
9. Utilize bounds of operand flows for longer-range prediction of permitted or probable execution paths.
10. Collapse stack manipulation instructions where offsetting pairs are detected and recorded.

While the invention has been particularly shown and described with reference to preferred embodiments thereof it will be understood by those skilled in the art that various changes in form and details may be made therein without departing from the spirit and scope of the invention.

I claim:

1. In a computer system having one or more instruction stores for storing instructions, instruction fetching means for fetching instructions from the instruction stores, and instruction execution means including one or more execution units for executing the instructions, and an instruction processing means comprising:

extended operand management indicator store means for storing extended operand management indicators persisting independently of retirement of operand accessing instructions and reuse of operand renaming storage, each extended operand management indicator pertaining to an operand and containing operand management information selected from the group consisting of
indicator of location of current value for the operand among operand store means and
indicated method for forwarding the operand between instructions and indication of loop iteration last updating the operand and
indication of stride distance of loop access to elements where the operand is a matrix and
indication of flow of the operand between program loops and
indication that the operand is a constant and
indication that the operand is seldom updated and
indication of the operand's location for input to a designated receiving instruction and
indication of the operand being subject of inter-CPU serialization and
indication of the operand being stored in a spin cache and
indication of which CPU last updated the operand and
indication of the farthest back branch after the operand was last updated and
indication that the operand is a virtual predicate and
indication that the operand is a stack pointer to be forwarded and
indication of separation in cycles between an operand's update and its subsequent use and
indication that the operand is a stack update nullification.

2. The system of claim 1 wherein said extended operand management indicator is stored in said extended operand management indicator store means accessed and indexed by said operand's storage address.

3. The system of claim 1 wherein said extended operand management indicator is stored in said extended operand management indicator store means accessed and indexed by instruction identifier of an instruction that updates said operand.

4. The system of claim 1 wherein said extended operand management indicator is stored in said extended operand management indicator store means accessed and indexed by instruction identifier of an instruction that inputs said operand.

5. The system of claim 1 wherein said operand is selected from the group consisting of
register operands and
special register operands and
condition codes and
floating point register operands and
control register operands and
memory operands and
matrix operands and
vector register operands and
and lock operands
stack pointer operands and
stack update nullification operands.

6. The system of claim 1 implemented as a computer program that executes on another computer.

7. The system of claim 1 wherein execution of a previously executed stack allocation operation responsive to one of said stack operand to be forwarded indicators causes forwarding of a stack pointer operand value to a previously mapped stack deallocation operation.

8. The system of claim 1 wherein execution of a previously executed stack allocation operation responsive to one of said stack update nullification indicators causes forwarding of a stack nullification operand to a previously mapped stack deallocation operation.

9. The system of claim 1 wherein one or more alternative operand storage means are selected responsive to said extended operand management indicators from the group consisting of:

storage of the operand value in one or more register files and
storage of the operand value in main memory and
storage of the operand value in a renamed memory location and
storage of the operand value in a renamed register and
storage of the operand value in one or more transient value stores and
storage of the operand value in one or more cache memories and
storage of the operand value in a k-cache and
storage of the operand value in a special register and
storage of the operand value in a data cache and
storage of the operand value in a condition code store and
storage of the operand value in an inter-processor signaling store and
storage of the operand value in a lock store and
storage of the operand value in one or more general caches and
storage of the operand value in one or more operand receiving instruction issue stores of one or more previously mapped operand receiving instructions.

10. In a computer system having one or more instruction stores for storing instructions, instruction fetching means for fetching instructions from the instruction stores, and instruction execution means including one or more execution units for executing the instructions, and an instruction processing means comprising:

selection means for selecting a forwarding method for forwarding an operand value from a source instruction producing the operand value to a target instruction that uses that value where said selection means is responsive to the separation in cycles between said source instruction and said target instruction as indicated in one or more extended operand management indicators stored and persisting independently from retirement of operand accessing instructions and wherein said forwarding method is selected from the group consisting of direct forwarding of the operand value to said target instruction and execution of said target instruction using said operand and storage of the operand value in a transient value store and storage of the operand value in an execution unit input queue and storage of the operand value in a k-cache and storage of the operand value in a register and storage of the operand value in a special register and storage of the operand value in a data cache and storage of the operand value in a general cache and storage of the operand value in an inter-processor signaling store and storage of the operand value in a lock store and storage of the operand value in main memory.

11. In a computer system having one or more instruction stores for storing instructions, instruction fetching means for fetching instructions from the instruction stores, and instruction execution means including one or more execution units for executing the instructions, and an instruction processing means comprising:

annotation means for annotating operands with loop source iteration indicators of operand source instructions that last updated each operand, iteration distance computation means for computing loop iteration flow distance indicators responsive to the difference between the iteration number of an instruction inputting said operand and said loop source iteration indicator for said operand, iteration counter means for storing loop iteration numbers responsive to execution of a loop-back branch instruction where said loop-back branch instruction branches to an instruction before said operand source instruction.

12. The system of claim 11 wherein operand forwarding means responsive to execution of said operand source instruction forwards the new operand value together with source iteration number to said inputting instruction.

13. The system of claim 12 wherein the operand forwarding means triggers execution of the inputting instruction.

14. The system of claim 11 wherein said loop source iteration indicators indicate more than one level of iteration and wherein said iteration counter is responsive to nested loops where the scope of outer loop-back branch instructions includes operand source instructions and the inner loop-back branches.

15. The system of claim 11 wherein an inter-loop indicator responsive to exit from a first loop and encounter of a subsequent loop-back branch where the target of said subsequent loop-back branch is after said loop-back branch of said first loop indicates that a second and separate loop is in operation, said iteration distance computation means includes inter-loop detection means responsive to said inter-loop indicator, said inter-loop extended operand management indicator stores the inter-loop iteration distance.

* * * * *